(12) United States Patent
Han et al.

(10) Patent No.: US 7,750,130 B2
(45) Date of Patent: *Jul. 6, 2010

(54) AZOBENZENE DERIVATIVE, FLUORESCENT PARTICLE AND METHOD OF FABRICATING THE SAME

(75) Inventors: Mina Han, Wako (JP); Masahiko Hara, Wako (JP)

(73) Assignee: Riken, Wako-shi (JP)

( * ) Notice: Subject to any disclaimer, the term of this patent is extended or adjusted under 35 U.S.C. 154(b) by 125 days.

This patent is subject to a terminal disclaimer.

(21) Appl. No.: 11/798,144

(22) Filed: May 10, 2007

(65) Prior Publication Data

US 2007/0264213 A1 Nov. 15, 2007

(30) Foreign Application Priority Data

May 11, 2006 (JP) .............................. 2006-133027
Mar. 13, 2007 (JP) .............................. 2007-064211

(51) Int. Cl.
*C09B 29/34* (2006.01)

(52) U.S. Cl. ........................ 534/649; 534/651; 534/843; 534/859; 534/DIG. 2; 977/788; 977/901

(58) Field of Classification Search ........................ None
See application file for complete search history.

(56) References Cited

U.S. PATENT DOCUMENTS

| | | | | |
|---|---|---|---|---|
| 2,009,086 | A * | 7/1935 | Jones | 514/150 |
| 2,393,652 | A * | 1/1946 | Olpin et. al. | 106/170.42 |
| 3,893,994 | A * | 7/1975 | Steinstrasser | 534/577 |
| 4,097,120 | A * | 6/1978 | vanderVeen et al. | 252/299.68 |
| 4,128,497 | A | 12/1978 | Cole, Jr. et al. | |
| 4,199,503 | A * | 4/1980 | Rentzea et al. | 534/701 |
| 7,335,752 | B2 * | 2/2008 | Han et al. | 534/843 |
| 2006/0194771 | A1 | 8/2006 | Han et al. | |

FOREIGN PATENT DOCUMENTS

| | | | |
|---|---|---|---|
| JP | 03-007390 | * | 1/1991 |
| JP | 10-008142 | * | 4/1998 |

OTHER PUBLICATIONS

Pajak et al., Spectrochimica Acta, Part A, 59A(9), 2131-2140, 2003.*
Bradley et al., Chemical Abstracts, 60:45461, 1964.*
Kuroki et al., Chemical Abstracts, 52:58755, 1958.*
Han et al., Chemical Abstracts, 146:194462, Jul. 2006.*
Han et al., "Intense Fluorescence from Light-Driven Self-Assembled Aggregates of Nonionic Azobenzene Derivative", Journal of the American Chemical Society, 127(31), 10951-10955, Jul. 16, 2005.*
Han et al., Chem. Mater., vol. 8, pp. 2784-2786 and S1-S5 (2006).
O. H. Wheeler et al., "Oxidation of Primary Aromatic Amines with Manganese Dioxide", Tetrahedron, vol. 20, 1964, pp. 189-193, XP002546405.
Database Beilstein [online] Beilstein Institute for Organic Chemistry, Frankfurt-Main, DE; XP002546408, Database accession No. 1838225(BRN).
W. Bradley et al., "Reactions of Diazonium Salts with Phenols and Amines in Non-Aqueous Media", Chimia, vol. 15, 1961, pp. 147-156, XP009122895.
E. Atherton et al., "Cis-trans Isomerism of Azo Dyes", Hexagon Digest, vol. 23, 1956, pp. 3-11, XP002546406.
J. Griffiths, "Photochemistry of Azobenzene and its Derivatives", Chem. Soc. Rev., vol. 1, 1972, pp. 481-493, XP002546407.

* cited by examiner

*Primary Examiner*—Fiona T Powers
(74) *Attorney, Agent, or Firm*—Birch, Stewart, Kolasch & Birch, LLP

(57) ABSTRACT

Provided is the azobenzene derivative denoted by general formula (I).

$$R^1-(X^1)_a-(Ar^1)_n-N=N-(Ar^2)_m-O-X-Y \quad (I)$$

In general formula (I), $R^1$ denotes a hydrogen atom or the like; $Ar^1$ and $Ar^2$ each independently denote an arylene group optionally comprising a substituent R or an aromatic heterocycle optionally comprising a substituent R, wherein $Ar^1$ and $Ar^2$ which are bonded through an azo group comprise at least two substituents denoted by R in total and multiple atoms and/or substituents denoted by R may be identical or different; R denotes a halogen atom or the like; X denotes an alkylene group optionally comprising a hetero atom; $X^1$ denotes —NH— or the like; Y denotes a hydrogen atom or the like; a denotes an integer ranging from 0 to 2; and m and n each independently denote an integer ranging from 1 to 8.

4 Claims, 16 Drawing Sheets

Azobenzene deriv.1

(a) Absorption spectra (b) Fluorescence emission spectra

Azobenzene deriv.2

(2)

(a) Absorption spectra (b) Fluorescence emission spectra

Azobenzene deriv.3

(a) Absoption spectra (b) Fluorescence emission spectra

Azobenzene deriv.4

(4)

(a) Absorption spectra (b) Fluorescence emission spectra

Azobenzene deriv. 5

(a) Absorption spectra (b) Fluorescence emission spectra

Azobenzene deriv. 6

(6)

(a) Absorption spectra (b) Fluorescence emission spectra

Azobenzene deriv. 7

(7)

(a) Absorption spectra (b) Fluorescence emission spectra

Change in color of fluorescence based on differences in excitation light of Azobenzene deriv. 1

Change in color of fluorescence based on differences in excitation light of azobenzene deriv. 4

Change in color of fluorescence based on differences in excitation light of azobenzene deriv. 8

(Standardized)

(Not standardized)

Change in color of fluorescence based on differences in excitation light of azobenze deriv. 9

(Standardized)

(Not standardized)

AZOBENZENE DERIVATIVE, FLUORESCENT PARTICLE AND METHOD OF FABRICATING THE SAME

CROSS-REFERENCE TO RELATED APPLICATIONS

This application claims benefit of priority under 35 USC 119 to Japanese Patent Application No. 2006-133027 filed on May 11, 2006 and Japanese Patent Application No. 2007-064211 filed on Mar. 13, 2007, which are expressly incorporated herein by reference in their entirety.

BACKGROUND OF THE INVENTION

1. Field of the Invention

The present invention relates to an azobenzene derivative capable of emitting stable fluorescence for an extended period by forming an aggregate, a fluorescent particle formed by aggregates of the azobenzene derivative, and a method of fabricating the fluorescent particle.

2. Discussion of the Background

Numerous organic chromophores and polymers have been proposed as fluorescent materials in recent years (see R. H. Friend, et al. *Nature* 1999, 397, 121; R. Jakubiak, et al. *J. Phys. Chem. A* 1999, 103, 2394; H. Murata, et al. *Appl. Phys. Lett.* 2002, 80, 189., which are expressly incorporated herein by reference in their entirety). However, although these fluorescent materials produce strong fluorescence in dilute solutions, there is a problem in that the intensity of fluorescence decreases in the solid state due to the formation of aggregates. It is difficult to achieve high-intensity fluorescence with such fluorescent materials when fabricating them into thin film devices.

By contrast, the present inventors have discovered a novel benzene derivative that emits almost no fluorescence before aggregation, but emits fluorescence of much greater intensity once aggregated (Japanese Unexamined Patent Publication (KOKAI) No. 2006-160715, referred to as "Reference 1" hereinafter, or English language family member US 2006/194771 A1, which are expressly incorporated herein by reference in their entirety).

When irradiation with ultraviolet light is continued after inducing isomerization from the trans form to the cis form by irradiation with ultraviolet light, the azobenzene derivative described in Reference 1 aggregates by self-organization, forming an aggregate that emits intense fluorescence.

When irradiation with ultraviolet light is halted and the aggregate is placed at room temperature in a dark location, isomerization from the cis form to the trans form takes place within the aggregate of the above azobenzene derivative, thereby permitting emission of even greater intensity. However, depending on the application, it is sometimes desirable to maintain a stable absorption spectrum or fluorescence of constant intensity following formation of the aggregate.

SUMMARY OF THE INVENTION

A feature of the present invention provides for a novel material capable of both emitting stable fluorescence and maintaining a stable absorption spectrum for extended periods.

A feature of the present invention relates to an azobenzene derivative denoted by general formula (I).

In general formula (I), $R^1$ denotes a hydrogen atom, halogen atom, alkoxy group, alkyl group, cycloalkyl group, aryl group, heterocyclic group, cyano group, ester group, ketone group, $-CA_3$, $-(C=O)A$, $-(C=O)NA_2$, -BA, -OA, -SA, -NA$_2$, $-(P=O)A_2$ or an organic fluorescent group, where A denotes a hydrogen atom, halogen atom, alkoxy group or alkyl group, as well as when multiple atoms and/or groups denoted by A are present in a single group, they may be identical to or different from each other;

$Ar^1$ and $Ar^2$ each independently denote an arylene group optionally comprising a substituent R or an aromatic heterocycle optionally comprising a substituent R, wherein $Ar^1$ and $Ar^2$ which are bonded through an azo group comprise at least two substituents denoted by R in total;

R denotes a halogen atom, alkoxy group, alkyl group, cycloalkyl group, aryl group, heterocyclic group, cyano group, ester group, ketone group, $-CA''_3$, $-(C=O)A''$, $-(C=O)NA''_2$, -BA'', -OA'', -SA'', -NA''$_2$, $-(P=O)A''_2$ or an organic fluorescent group, where A" denotes a hydrogen atom, halogen atom, alkoxy group or alkyl group, as well as when multiple atoms and/or groups denoted by A" are present in a single group, they may be identical to or different from each other;

X denotes an alkylene group optionally comprising a hetero atom;

$X^1$ denotes $-NH-$, $-O-$, $-S-$ or an alkylene group optionally comprising a hetero tom or a connecting group;

Y denotes a hydrogen atom, -BA', -CA'$_3$, -OA', -NA'$_2$, -PA'$_2$, or -SA', where A'denotes a hydrogen atom, halogen atom, alkoxy group or alkyl group, as well as when multiple atoms and/or groups denoted by A' are present in a single group, they may be identical to or different from each other;

a denotes an integer ranging from 0 to 2; and m and n each independently denote an integer ranging from 1 to 8, where, when multiple arylene groups and/or aromatic heterocycles denoted by $Ar^1$ are present with n being an integer equal to or greater than 2, they may be identical to or different from each other, as well as when multiple arylene groups and/or aromatic heterocycles denoted by $Ar^2$ are present with m being an integer equal to or greater than 2, they may be identical to or different from each other.

In one embodiment, the azobenzene derivative is denoted by general formula (II).

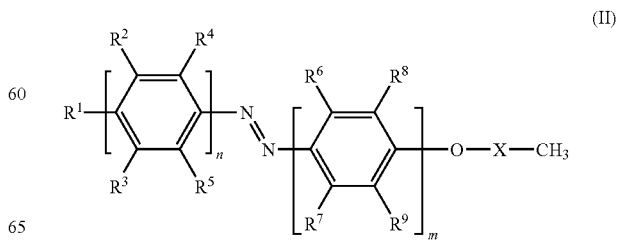

In general formula (II), $R^2$ to $R^9$ each independently denote a halogen atom, alkoxy group, alkyl group, cycloalkyl group, aryl group, heterocyclic group, cyano group, ester group, ketone group, -CA"$_3$, —(C═O)A", —(C═O)NA"$_2$, -BA", -OA", -SA", -NA"$_2$, —(P═O)A"$_2$ or an organic fluorescent group, where A" denotes a hydrogen atom, halogen atom, alkoxy group or alkyl group, as well as when multiple atoms and/or groups denoted by A" are present in a single group, they may be identical to or different from each other, wherein at least two from among $R^2$ to $R^9$ in two phenylene rings bonded through an azo group are substituents other than hydrogen atoms, $R^1$, X, m and n are the same as those defined in general formula (I), and when multiple atoms and/or groups denoted by any of $R^2$ to $R^9$ are present with n and/or m being an integer equal to or greater than 2, they may be identical to or different from each other.

In one embodiment, in general formula (II), at least $R^4$ and $R^5$ or $R^6$ and $R^7$ in two phenylene rings bonded through an azo group are substituents other than hydrogen atoms.

In one embodiment, in general formula (II), $R^4$ and $R^5$ in two phenylene rings bonded through an azo group each independently denote an alkyl group having 1 to 28 carbon atoms or an alkoxy group having 1 to 28 carbon atoms.

A feature of the present invention further relates to a fluorescent particle formed by aggregates of the azobenzene derivative.

A feature of the present invention still further relates to a method of fabricating the fluorescent particle, wherein UV light is irradiated to a solution comprising an organic solvent and the azobenzene derivative to form aggregates of the azobenzene derivative.

A feature of the present invention still further relates to a method of fabricating a fluorescent particle emitting desired fluorescence when excited by irradiation with light of a predetermined wavelength, comprising:

determining a candidate derivative that is the azobenzene derivative, which is a candidate for an azobenzene derivative used to obtain the fluorescent particle;

forming aggregates of the candidate derivative by irradiating with UV light a solution comprising the candidate derivative and an organic solvent;

irradiating the aggregates formed with excitation light of the desired wavelength;

when the fluorescence emitted by irradiation with the excitation light is:

(1) the desired fluorescence, determining the candidate derivative as the azobenzene derivative for use in fabricating the fluorescent particle;

(2) light of shorter wavelength than the desired fluorescence, determining, as the azobenzene derivative for use in fabricating the fluorescent particle, an azobenzene derivative, which has a structure in which one or more substituents comprised in the candidate derivative has been replaced with one or more substituents of higher electron-donating ability, has a structure in which one or more electron-donating groups have been incorporated into the candidate derivative, and/or has a structure in which one or more atoms comprised in the ring structure of the candidate derivative has been replaced with one or more atoms of higher electron-donating ability; or (3) light of longer wavelength than the desired fluorescence, determining, as the azobenzene derivative for use in fabricating the fluorescent particle, an azobenzene derivative, which has a structure in which one or more substituents comprised in the candidate derivative has been replaced with one or more substituents of higher electron-withdrawing ability, has a structure in which one or more electron-withdrawing groups have been incorporated into the candidate derivative, and/or has a structure in which one or more atoms comprised in the ring structure of the candidate derivative has been replaced with one or more atoms of higher ability; and irradiating with UV light a solution comprising the azobenzene derivative that has been determined and an organic solvent to form aggregates of the determined azobenzene derivative.

The present invention can provide fluorescent particles emitting stable fluorescence and maintaining a stable absorption spectrum for extended periods.

The azobenzene derivative of the present invention also has properties whereby the wavelength of the fluorescence of fluorescent particles formed by the aggregate shifts to a shorter wavelength with the introduction of an electron-withdrawing group, and shifts to a longer wavelength with the introduction of an electron-donating group. By exploiting these properties, it is possible to readily design a fluorescent material that emits a desired fluorescence based on its molecular structure and functional groups.

The fluorescent particles of the present invention have a further property of having multiple excitation wavelengths. They may possess a property whereby fluorescence of different wavelengths is emitted by varying the excitation wavelength. By exploiting these properties, it is possible to obtain fluorescence of different colors from the same fluorescent particles.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

DESCRIPTIONS OF THE EMBODIMENTS

Figure 1:
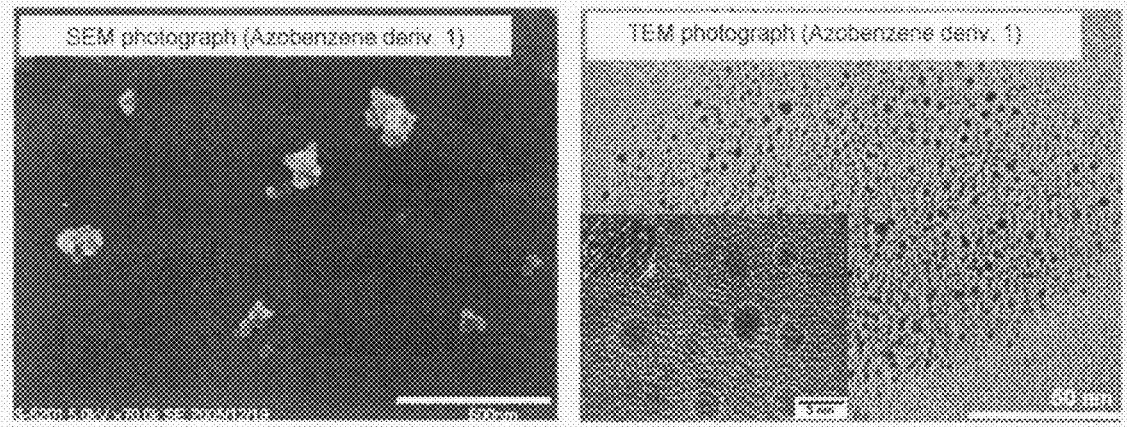
FIG. 1 shows SEM and TEM photographs of a solution containing azobenzene derivative 1.

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description taken with the drawings making apparent to those skilled in the art how the several forms of the present invention may be embodied in practice.

Azobenzene Derivative

The azobenzene derivative of the present invention is denoted by the following general formula (I):

$$R^1\!-\!(X^1)_a\!-\!(Ar^1)_n\!-\!N\!\!=\!\!N\!-\!(Ar^2)_m\!-\!O\!-\!X\!-\!Y \qquad (I)$$

Details of general formula (I) will be described below.

In general formula (I), $R^1$ denotes a hydrogen atom, halogen atom, alkoxy group, alkyl group, cycloalkyl group, aryl group, heterocyclic group, cyano group, ester group, ketone group, -CA$_3$, —(C=O)A, —(C=O)NA$_2$, -BA, -OA, -SA, -NA$_2$, —(P=O)A$_2$ or an organic fluorescent group, where A denotes a hydrogen atom, halogen atom, alkoxy group or alkyl group, as well as when multiple atoms and/or groups denoted by A are present in a single group, they may be identical to or different from each other.

Examples of the halogen atom are fluorine, chlorine, and bromine.

The alkoxy group may have 1 to 28 carbon atoms; specific examples are $CH_3O$— group and $CH_3CH_2O$— group.

The alkyl group may have a linear or branched chain with 1 to 28 carbon atoms; specific examples are the groups $CH_3$—, $CH_3CH_2$—, $CH_3CH_2CH_2CH_2CH_2CH_2$—, and $CH_3CH_2(CH_3)CH$-(sec-butyl).

The cycloalkyl group may have 5 or 6 carbon atoms; that is, it may be a cyclopentyl or cyclohexyl group.

The aryl group may be, for example, a monocyclic phenyl group, or an aryl group derived from condensed rings, such as naphthalene, anthracene, phenanthrene, phenalene, triphenylene, or pyrene.

The heterocyclic group may be, for example, a nitrogen-containing heterocyclic group (such as a pyridyl group). The ester group may be an R'OCO— group (where R' denotes a hydrogen atom or alkyl group), with $R^1$ desirably denoting a hydrogen atom, methyl group, or ethyl group.

In the groups denoted by -CA$_3$, —(C=O)A, —(C=O)NA$_2$, -BA, -OA, -SA, -NA$_2$, and —(P=O)A$_2$, A denotes a hydrogen atom, halogen atom, alkoxy group, or alkyl group, with A being identical to or different from each other when multiple atoms and/or groups denoted by A are present in a single group. The alkoxy groups and alkyl groups contained in these groups are as set forth above. In these groups, C denotes a carbon atom, O denotes an oxygen atom, N denotes a nitrogen atom, B denotes a boron atom, S denotes a sulfur atom, and P denotes a phosphorus atom. Specific examples of these groups are: —CF$_3$, —(C=O)H, —(C=O)CH$_3$, —CONHCH$_3$, —B(CH$_3$)$_2$, —(P=O)(OCH$_2$CH$_3$)$_2$, —OH, —NH(CH$_3$), and —SH.

Known organic fluorescent substances, such as thiophene derivatives, p-phenylene ethynylene derivatives, carbazole derivatives, and pyrene derivatives, are examples of organic fluorescent groups. Fluorescence of a different color can be obtained from a single particle by incorporating an organic fluorescent group in the form of a group emitting fluorescence when excited by light of a different wavelength than the fluorescent particle formed by aggregation of the azobenzene derivative. The fluorescent particle in the form of an aggregate of the azobenzene derivative of the present invention, as set forth further below, can emit fluorescence of different wavelengths (different colors) when excited by light of different wavelengths, even when not possessing an organic fluorescent group.

From the perspective of the ready availability of materials, $R^1$ desirably denotes a hydrogen atom, halogen atom, aryl group, amide group, aldehyde group, heterocyclic group, ester group, ketone group, alkoxy having 1 to 28 carbon atoms or alkyl group having 1 to 28 carbon atoms, or cyano group.

$Ar^1$ and $Ar^2$ each independently denote an arylene group optionally comprising a substituent R or an aromatic heterocycle optionally comprising a substituent R. The arylene group may be monocyclic, or may be a group derived from condensed rings, such as naphthalene, anthracene, phenanthrene, phenalene, triphenylene, pyrene, or the like. A phenylene group is preferred.

One example of an aromatic heterocycle is a ring structure comprised of the above arylene group in which one or more of the carbon atoms have been substituted with hetero atoms. A specific example is a pyridinylene group in which one of the carbon atoms of the phenylene group has been substituted with a nitrogen atom.

Substituent R, which may be present in $Ar^1$ and $Ar^2$, denotes a halogen atom, alkoxy group, alkyl group, cycloalkyl group, aryl group, heterocyclic group, cyano group, ester group, ketone group, -CA"$_3$, —(C=O)A", —(C=O)NA"$_2$, -BA", -OA", -SA", -NA"$_2$, —(P=O)A"$_2$ or an organic fluorescent group, where A" denotes a hydrogen atom, halogen atom, alkoxy group or alkyl group, as well as when multiple atoms and/or groups denoted by A" are present in a single group, they may be identical to or different from each other; the details are as described for $R^1$ above.

In general formula (I), $Ar^1$ and $Ar^2$ which are bonded through an azo group comprise at least two substituents denoted by R in total, resulting in increase of the stability of the intensity of the fluorescence following the formation of an aggregate. This is thought to occur because the incorporation of substituents at azobenzene sites increases solubility in solvents, forming a more solid aggregate, and because the effect of the substituents increases the stability of the cis form following formation of the aggregate, suppressing isomerization from the cis form to the trans form. Sometimes one from among $Ar^1$ and $Ar^2$, which are bonded through azo groups, has two or more substituents denoted by R and the other has none, and sometimes each of $Ar^1$ and $Ar^2$ has one or more substituents denoted by R. The details are as set forth in the description of general formula (II) given further below. The multiple substituents denoted by R in general formula (I) may be identical to or different from each other.

X denotes an alkylene group optionally comprising a hetero atom. Examples of this hetero atom are B, N, O, P, and S. A preferred embodiment for X is as described further below for general formula (III).

$X^1$ denotes —NH—, —O—, —S—, or an alkylene group optionally comprising a hetero atom or a connecting group. The details of the alkylene group denoted by $X^1$ are identical to those of X above; preferred hetero atoms are B, P, and S, and —(C=O)— is an example of the connecting group.

Y denotes a hydrogen atom, -BA', -CA'$_3$, -OA', -NA'$_2$, -PA'$_2$, or -SA', where A' denotes a hydrogen atom, halogen atom, alkoxy group or alkyl group, as well as when multiple atoms and/or groups denoted by A' are present in a single group, they may be identical to or different from each other. Examples of the halogen atom denoted by A' are fluorine, chlorine, and iodine atoms. An example of the alkoxy group denoted by A' is an alkoxy group having 1 to 28 carbon atoms. An example of the alkyl group denoted by A' is a linear or branched alkyl group having 1 to 28 carbon atoms. Y desirably denotes a hydrogen atom, -BA', -CA'$_3$, -OA', or -NA'$_2$, with -CA'$_3$ being preferred and a methyl group being particularly preferred.

a denotes 0, 1, or 2.

m and n each independently denote an integer ranging from 1 to 8. From the perspective of forming particles (aggregate), n is desirably equal to or greater than 2 and m is desirably 1 or 2. When multiple arylene groups and/or aromatic heterocycles denoted by $Ar^1$ are present with n being an integer equal to or greater than 2, they may be identical to or different from each other, as well as when multiple arylene groups and/or aromatic heterocycles denoted by $Ar^2$ are present with m being an integer equal to or greater than 2, they may be identical to or different from each other.

An example of a preferred embodiment of general formula (I) is general formula (III) below.

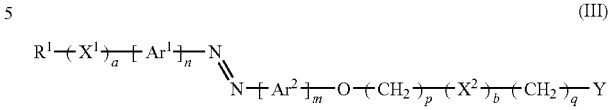

(III)

In general formula (III), p and q each independently denote an integer ranging from 0 to 28; p desirably denotes an integer ranging from 1 to 28, and q desirably denotes an integer ranging from 1 to 28.

$X^2$ denotes a hetero atom or an alkylene group comprising a hetero atom. Examples of this hetero atom are halogens (such as fluorine, chlorine, and iodine atoms), B, N, O, P, and S. b denotes an integer ranging from 0 to 2. When b denotes an integer of equal to or greater than 2, the multiple $X^2_s$ that are present may be identical to or different from each other.

In general formula (III), $R^1$, $X^1$, $Ar^1$, $Ar^2$, Y, a, m, and n are as set forth above for general formula (I).

Another example of a preferred embodiment of general formula (I) is general formula (II) below.

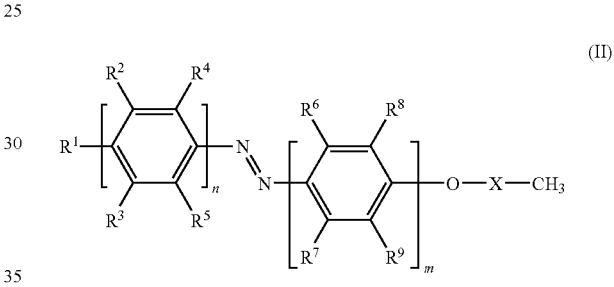

(II)

In general formula (II), $R^2$ to $R^9$ each independently denote a halogen atom, alkoxy group, alkyl group, cycloalkyl group, aryl group, heterocyclic group, cyano group, ester group, ketone group, -CA"$_3$, —(C=O)A", —(C=O)NA"$_2$, -BA", -OA", -SA", -NA"$_2$, —(P=O)A"$_2$ or an organic fluorescent group, where A" denotes a hydrogen atom, halogen atom, alkoxy group or alkyl group, as well as when multiple atoms and/or groups denoted by A" are present in a single group, they may be identical to or different from each other. The details are as set forth for R in general formula (I) above.

In general formula (II), at least two from among $R^2$ to $R^9$ in two phenylene rings bonded through an azo group are substituents other than hydrogen atoms. From the perspective of the stability of the cis form, among $R^2$ to $R^9$ in the two phenylene rings bonded through azo groups, at least $R^4$ and $R^5$, or $R^6$ and $R^7$, desirably denote substituents other than hydrogen atoms, or $R^4$, $R^5$, and at least one from among $R^6$ and $R^9$ (for example, $R^9$) desirably denote substituents other than hydrogen atoms.

The above substituents other than hydrogen may have either electron-donating ability or electron-withdrawing ability. Substituents having electron-donating ability (electron-donating groups) and substituents having electron-withdrawing ability (electron-withdrawing groups) are described in detail by C. Hansch et al. *Chem. Rev.* 1991, 91, 165; and Smith, M. B., March, J. *March's Advanced Organic Chemistry: Reactions, Mechanisms, and Structure*, 5$^{th}$ Ed., Wiley-Interscience: John Wiley & Sons, Inc., 2001, which is expressly incorporated herein by reference in its entirety. Examples of desirable substituents other than hydrogen are alkyl groups, alkoxy groups, cycloalkyl groups, amide groups, aldehyde groups, cyano groups, ester groups, ketone groups, and heterocyclic groups. From the perspective of the ready availability of starting materials, the above alkyl groups desirably have 1 to 28 carbon atoms, and the above alkoxy group desirably has 1 to 28 carbon atoms. However, as will be set forth further below, it is desirable to determine the substituent that is incorporated based on its electron-withdrawing ability or electron-donating ability to obtain a fluorescent particle emitting desired fluorescence.

$R^1$, X, m and n in general formula (II) are the same as those defined in general formula (I). When multiple atoms and/or groups denoted by any of $R^2$ to $R^9$ are present with n and/or m being an integer equal to or greater than 2, they may be identical to or different from each other.

Specific examples of the azobenzene derivative of the present invention are given below. More specific examples are the compounds described in Examples. However, the present invention is not to be construed as being limited by these specific examples. In the specific examples given below, substituents are present in moieties $R^4$, $R^5$, and $R^9$. However, as will be set forth further below, it is possible to incorporate an electron-withdrawing group and/or electron-donating group at an additional site on the phenylene group, and/or to replace one or more of the carbon atoms constituting the phenylene group with electron-withdrawing and/or electron-donating atoms (such as nitrogen atoms) to adjust the color of the fluorescence.

In the above formulae, $R^4$ and $R^5$ are as defined above, each preferably denoting a substituent of greater steric hindrance than a hydrogen atom, more preferably an alkyl group, alkoxy group, cycloalkyl group, amide group, aldehyde group, ester group, ketone group, cyano group, or heterocyclic group. $R^9$ is defined as above, preferably denoting a hydrogen atom, alkyl group, alkoxy group, cycloalkyl group, amide group, aldehyde group, ester group, ketone group, cyano group, or heterocyclic group. p' denotes an integer ranging from 0 to 28, preferably an integer ranging from 5 to 28.

The azobenzene derivative of the present invention can be synthesized by known methods. For details on synthesis methods, for example, see Xu, Z-S.; Lemieux, R. P.; Natansohn, A.; Rochon, P.; Shashidhar, R. *Liq. Cryst.* 1999, 26, 351 to 359, which are expressly incorporated herein by reference in their entirety.

An example of a synthesis method is given below. However, the method of synthesizing the azobenzene derivative of the present invention is not limited to the method described below. In general formulae (IV) to (VIII) below, $R^1$ to $R^9$, n, and p' are defined as above. Z denotes a substituent such as a halogen atom, —OH group, —COOH group, —NH$_2$ group, or —NHR" group (where R" denotes an alkyl group).

First, the starting compound denoted by general formula (IV) and the starting compound denoted by general formula (V) are diazo-coupled to obtain the hydroxyazobenzene derivative denoted by general formula (VI).

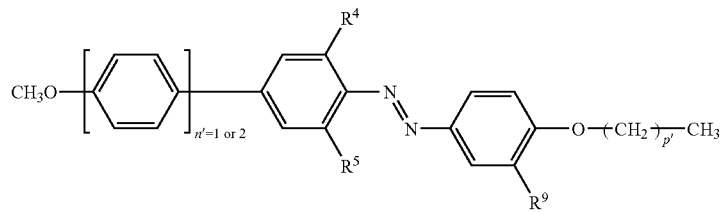

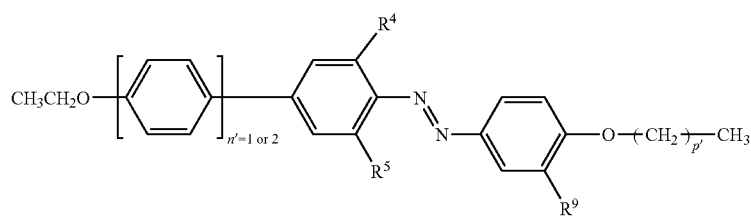

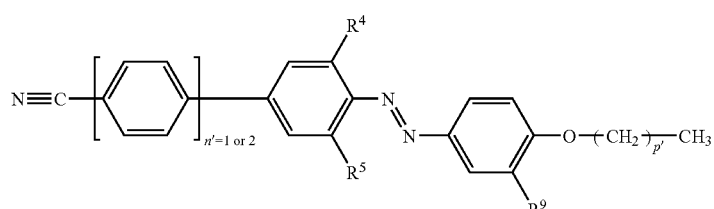

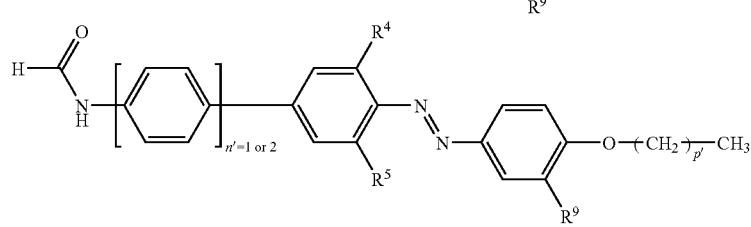

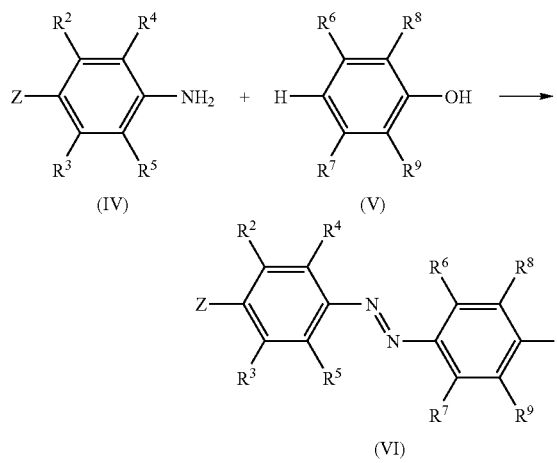

Next, an alkyl group is introduced into the hydroxyazobenzene derivative (VI) obtained to obtain the intermediate (VII) given below.

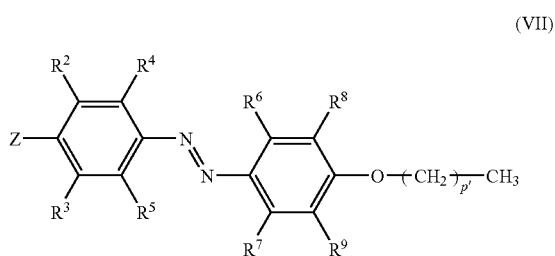

Subsequently, a Prescribed Substituent is Introduced into the Z Moiety of intermediate (VII) to obtain the targeted azobenzene derivative (VIII) shown below. The azobenzene derivative obtained can be purified by a known method such as column chromatography. The product obtained can be confirmed by a known method such as NMR, IR, mass spectroscopy, elemental analysis, or the like. The starting compounds employed in the synthesis of the azobenzene derivative of the present invention can be synthesized by known methods, and some of them are available as commercial products.

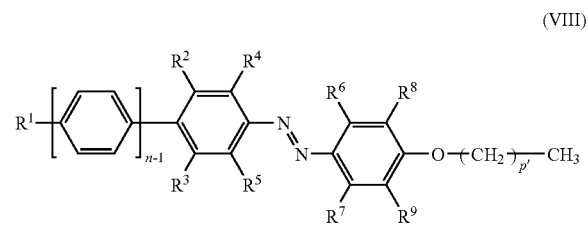

Fluorescent particle and manufacturing method thereof.

The fluorescent particle of the present invention is formed by aggregates of the azobenzene derivative of the present invention. This aggregate is formed by association through the self-organization of the azobenzene derivative of the present invention. The term "fluorescent particle" refers to a particle emitting fluorescence when irradiated with excitation light.

The fluorescent particle of the present invention can be obtained by forming aggregates of the above azobenzene derivative by irradiating a solution containing the azobenzene derivative of the present invention and an organic solvent with UV light. The UV light employed can be commonly employed UV light (with a wavelength of 320 to 400 nm, for example); for example, it is possible to use UV light with a wavelength of 365 nm or 366 nm. In selecting the solvent, it is desirable to take into account such factors as whether or not it is a good solvent to the azobenzene derivative used to form the particle; whether or not the particle formed is stable and does not break down even when exposed to light for extended periods; and whether or not the absorption wavelength of the solvent does not overlap the absorption wavelength of the azobenzene derivative employed. Examples of such solvents that are suitable for use are dichloromethane, chloroform, cyclohexane, hexane, benzene, toluene, THF, and DMF.

The concentration of the azobenzene derivative in the solvent can be suitably set; by way of example, it can be $10^{-8}$ M or greater, preferably $10^{-6}$ to $10^{-1}$ M.

Azobenzenes come in cis and trans forms, with the trans form being more thermally stable of the two. When the trans form is irradiated with UV light, it isomerizes into the cis form. When subsequently placed in a dark location at room temperature, it is known to change back into the trans form. The azobenzene derivative of the present invention also undergoes isomerization from the trans to the cis form when irradiated with UV light for several minutes, for example. Further, the azobenzene derivative of the present invention forms aggregates (particle) by association through self-organization when irradiation with UV light is continued after the azobenzene derivative has undergone isomerization from the trans form to the cis form. Still further, aggregates of the azobenzene derivative of the present invention undergo little or no dissociation even when the particle is left standing after stopping irradiation with UV light following forming aggregates (particle). Since there is little change in the absorption spectrum, fluorescence wavelength, or intensity of fluorescence before and after standing, fluorescent particles emitting stable fluorescence over an extended period are obtained. The fact that there is little change in the absorption spectrum shows that re-isomerization from the cis form to the trans form is inhibited in the aggregate, that is, that the cis form is stable in the aggregate.

In the present invention, the period of irradiation with UV light for forming particles is suitably made longer than the time required for isomerization from the trans form to the cis form; for example, this period can be set to from 3 minutes to 30 hours, preferably from 6 to 30 hours. When the azobenzene solution is highly concentrated, it is desirable to increase the period of irradiation with UV light in order for adequate particle formation to take place. The period required to form particles varies with the intensity of the UV light; the use of high-intensity UV light is desirable to rapidly form particles. The intensity of the UV light can be set to from 0.1 to 30 mW/cm$^2$, for example.

The particles of the present invention can be spherical, for example. The diameter of the particles is on the order from several nanometers to several hundred nanometers, for example. The diameter of the particles can be determined from an image obtained by scanning electron microscopy (SEM) or transmission electron microscopy (TEM). Further, a crystalline lattice structure is sometimes observed by TEM within the particles of the present invention.

The azobenzene derivative of the present invention emits almost no fluorescence prior to formation of aggregates. However, once aggregates (particle) have been formed, it emits fluorescence that is much more intense than that emitted prior to the formation of aggregates. Further, stable fluorescence can be maintained for an extended period following formation of aggregates. For example, the azobenzene derivative of the present invention can emit stable fluorescence (for example, having a rate of change in fluorescence intensity at $\lambda_{max}$ of about 5 percent or less) over a period of 6 months or more after stopping the irradiation of light following the formation of aggregates.

Further, the fluorescent particle in the form of aggregates of the azobenzene derivative of the present invention, as will be shown by Examples described further below, can be made to emit fluorescence of differing wavelengths by being excited with light of differing wavelengths. This property can be exploited to obtain fluorescence of differing wavelengths (differing colors) from a single type of fluorescent particle.

The type and number of functional groups incorporated into the azobenzene skeleton, and the type of atoms constituting the ring structure, of the azobenzene derivative of the present invention can be changed to control the color of the fluorescence of the fluorescent particle. This point will be described below.

Irradiation with excitation light is required to cause fluorescent particles to emit light. For example, when a certain azobenzene derivative is irradiated with excitation light of predetermined wavelength and the fluorescence obtained is not of the desired color (wavelength), another azobenzene derivative is employed to obtain fluorescent particles emitting the desired fluorescence. However, as will be described in Examples further below, the azobenzene derivative of the present invention has properties whereby the greater the electron-withdrawing ability of the substituent that is incorporated, the greater the shift of the fluorescence of the fluorescent particles formed by that derivative to the short wavelength side, and the greater the electron-donating ability of the substituent that is incorporated, the greater the shift of the fluorescence of the fluorescent particles formed by that derivative to the long wavelength side. Further, the fluorescence of the fluorescent particles formed by a certain derivative can be shifted to the short wavelength side by replacing the atoms contained in the ring structure (for example, $Ar^1$ and $Ar^2$ in general formula (I)) in that derivative with atoms of great electron-withdrawing ability, and shifted to the long wavelength side by replacement with atoms of great electron-donating ability. This property can be exploited to readily design fluorescent particles emitting fluorescence of desired color (wavelength) when excited by irradiation with light of a certain wavelength based on their molecular structure (functional groups, atoms constituting the ring structure).

That is, the azobenzene derivative of the present invention can be employed to manufacture fluorescent particles emitting desired fluorescence when excited by irradiation with light of a predetermined wavelength by the method comprising:

determining a candidate derivative that is the azobenzene derivative of claim 1, which is a candidate for an azobenzene derivative used to obtain the fluorescent particle;

forming aggregates of the candidate derivative by irradiating with UV light a solution comprising the candidate derivative and an organic solvent;

irradiating the aggregates formed with excitation light of the desired wavelength;

when the fluorescence emitted by irradiation with the excitation light is:

(1) the desired fluorescence, determining the candidate derivative as the azobenzene derivative for use in fabricating the fluorescent particle;

(2) light of shorter wavelength than the desired fluorescence, determining, as the azobenzene derivative for use in fabricating the fluorescent particle, an azobenzene derivative of claim 1, which has a structure in which one or more substituents comprised in the candidate derivative has been replaced with one or more substituents of higher electron-donating ability, has a structure in which one or more electron-donating groups have been incorporated into the candidate derivative, and/or has a structure in which one or more atoms comprised in the ring structure of the candidate derivative has been replaced with one or more atoms of higher electron-donating ability; or (3) light of longer wavelength than the desired fluorescence, determining, as the azobenzene derivative for use in fabricating the fluorescent particle, an azobenzene derivative of claim 1, which has a structure in which one or more substituents comprised in the candidate derivative has been replaced with one or more substituents of higher electron-withdrawing ability, has a structure in which one or more electron-withdrawing groups have been incorporated into the candidate derivative, and/or has a structure in which one or more atoms comprised in the ring structure of the candidate derivative has been replaced with one or more atoms of higher ability; and irradiating with UV light a solution comprising the azobenzene derivative that has been determined and an organic solvent to form aggregates of the determined azobenzene derivative.

The wavelength of the excitation light and the wavelength (color) of the desired fluorescence can be determined in consideration of the light source employed and the use objective. For example, when the candidate derivative emits green fluorescence but blue fluorescence (light of shorter wavelength) is desired, it suffices to select a structure for the azobenzene derivative by obtaining fluorescent particles based on (2) above. When the desired fluorescence is red (light of longer wavelength), it suffices to select a structure for the azobenzene derivative by obtaining fluorescent particles based on (3) above. The Hammett constant, for example, can be employed as an index of the electron-donating ability and electron-withdrawing ability of substituents and atoms. The Hammett constant is described in, for example, *Chem. Rev.* 1991, 91, 165, which is expressly incorporated herein by reference in its entirety. The following are examples of Hammett constants (given in parentheses): CN— (0.66), —$CF_3$ (0.54), —COOMe (0.45), —$CF_3O$ (0.35), —H (0), —$CH_3$ (−0.17), -EtO (−O.24), -MeO (−0.27), BuO— (−0.32), and $NMe_2$ (−0.83).

As mentioned above, the methods of (i) changing a substituent, (ii) introducing a new substituent, and (iii) changing an atom constituting the ring structure can be adopted to shift the wavelength of the fluorescence. Methods (i) to (iii) can be combined as desired to obtain fluorescent particles emitting fluorescence of desired color.

EXAMPLES

The present invention will be described in detail below based on examples. However, the present invention is not limited to the examples.

1. Synthesis of Azobenzene Derivative

Azobenzene derivative 1 was synthesized by the following method.

(1) Synthesis of Hydroxyazobenzene Derivative (IX)

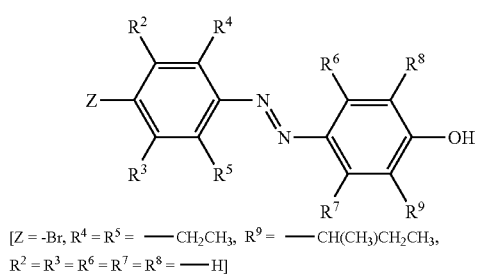

(IX)

[Z = -Br, R⁴ = R⁵ = —CH₂CH₃, R⁹ = —CH(CH₃)CH₂CH₃,
R² = R³ = R⁶ = R⁷ = R⁸ = —H]

NaNO$_2$ (1.035 g) was dissolved in 20 mL of water; the solution was slowly added dropwise to a mixed solution of 4-bromo-2,6-diethylaniline (3 g), HCl (8 mL), and water (100 mL) at 0 to 5° C.; and the mixture was stirred for 30 minutes. To this solution were added the mixture of 2-sec-butylphenol (2.25 g), NaOH (1.04 g), Na$_2$CO$_3$ (2.75 g), and water, and the mixture was stirred for 2 hours. Ethyl acetate was added and the mixture was stirred. The organic layer was collected and separated by column chromatography employing a mixed solvent of hexane and ethyl acetate (10:1) as the developing solvent, yielding 3.6 g of hydroxyazobenzene derivative (IX).

$^1$H NMR (270 MHz, CDCl$_3$) δ 0.8-1.8 (m, 14, C$\underline{H}_3$ and C$\underline{H}_2$), 2.59 (q, 4H, C$\underline{H}_2$ CH$_3$), 2.94 (m, 1H, C$\underline{H}$), 6.69-7.74 (m, 5H, Ar—$\underline{H}$)

(2) Synthesis of Intermediate (X)

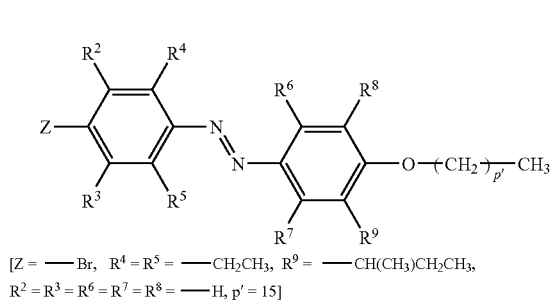

(X)

[Z = —Br, R⁴ = R⁵ = —CH₂CH₃, R⁹ = —CH(CH₃)CH₂CH₃,
R² = R³ = R⁶ = R⁷ = R⁸ = —H, p' = 15]

A mixed solution of K$_2$CO$_3$ (2.13 g), tetraethylammonium bromide (catalytic quantity), 1-bromohexadecane (7.06 g), and acetone (100 mL) was stirred for 30 minutes at 60° C. in a nitrogen atmosphere. To this mixed solution was slowly added the acetone solution of hydroxyazobenzene derivative (IX) (3.0 g) synthesized in (1) above and the mixture was stirred for 13 hours at 60° C. The acetone was removed, the mixture was washed three times with water, ethyl acetate was added, the mixture was stirred, and the organic layer was collected. Separation was conducted by column chromatography using hexane as developing solvent, yielding 3.3 g of intermediate (X).

$^1$H NMR (270 MHz, CDCl$_3$) δ 0.85 (m, 6H, C$\underline{H}_3$), 1.0-1.8 (m, 19H, C$\underline{H}_2$ and C$\underline{H}_3$), 2.57 (q, 4H, Ar—C$\underline{H}_2$CH$_3$), 3.12 (m, 1H, C$\underline{H}$), 4.02 (t, 2H, ArOC$\underline{H}_2$), 6.70-7.72 (m, 5H, Ar—$\underline{H}$)

(3) Synthesis of Azobenzene Derivative 1

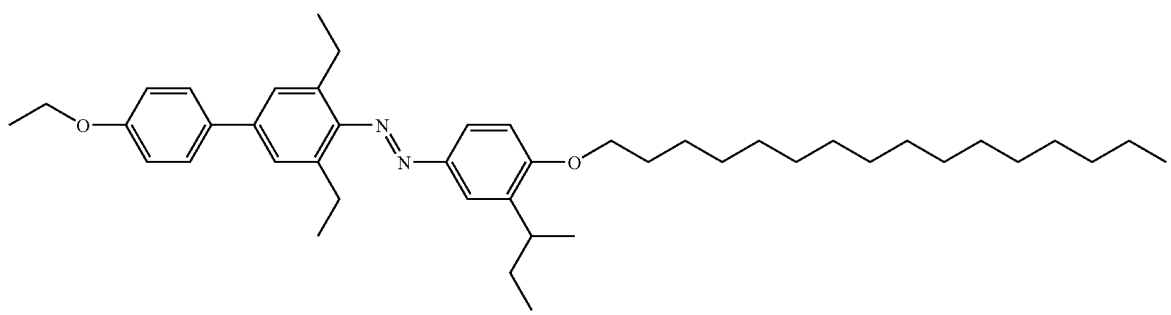

(1)

The intermediate (X) (2.46 g) synthesized in (2) above was dissolved in 50 mL of DMF in a nitrogen atmosphere, Pd(PPh$_3$)$_4$ (catalytic quantity) was added, and the mixture was stirred for 10 minutes. To this mixed solution were added 4-ethoxyphenylboronic acid (1 g), NaHCO$_3$ (1.68 g) dissolved in distilled water (30 mL), and toluene (20 mL). The mixture was stirred for 28 hours at 100° C. Subsequently, the mixture was cooled to room temperature, water and ethyl acetate were added, and the mixture was stirred. The organic layer was collected and separated by column chromatography employing a mixed solution of hexane and dichloromethane (6:1) as developing solvent. The product (azobenzene derivative 1) was in the form of orange crystals; the yield was 0.39 g.

$^1$H NMR (270 MHz, CD$_2$Cl$_2$) δ 0.88 (tt, 6H, C$\underline{H}_3$), 1.16-1.87 (m, 42H, C$\underline{H}_2$ and C$\underline{H}_3$), 2.74 (q, 4H, ArC$\underline{H}_2$CH$_3$), 3.18 (m, 1H, ArOC$\underline{H}$(CH$_3$)CH$_2$CH$_3$), 4.04-4.12 (tq, 4H, ArOC$\underline{H}_2$CH$_3$ and ArOC$\underline{H}_2$), 6.96-7.00 (dd, 3H, Ar—$\underline{H}$), 7.33 (s, 2H, Ar—$\underline{H}$), 7.59 (d, 2H, Ar—$\underline{H}$), 7.71-7.77 (m, 3H, Ar—$\underline{H}$).

Anal. Calcd: C, 80.68; H, 10.16; N, 4.28. Found: C, 80.65; H, 10.14; N, 4.22.

Azobenzene derivatives 2 to 7 below were prepared by varying the starting compounds in the above method. Analysis results for the products are given below.

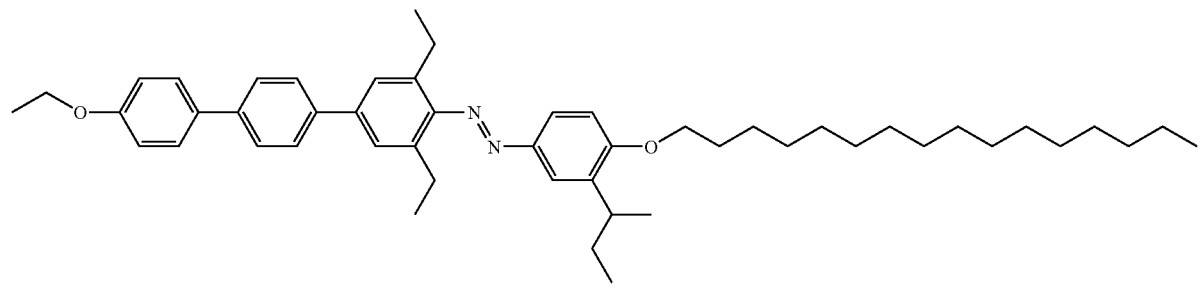
(2)
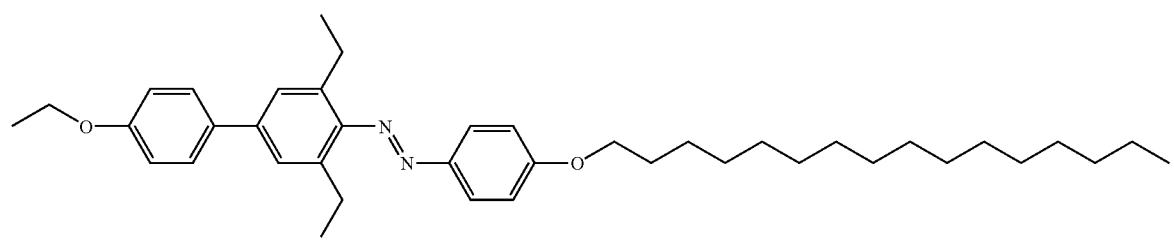
(3)
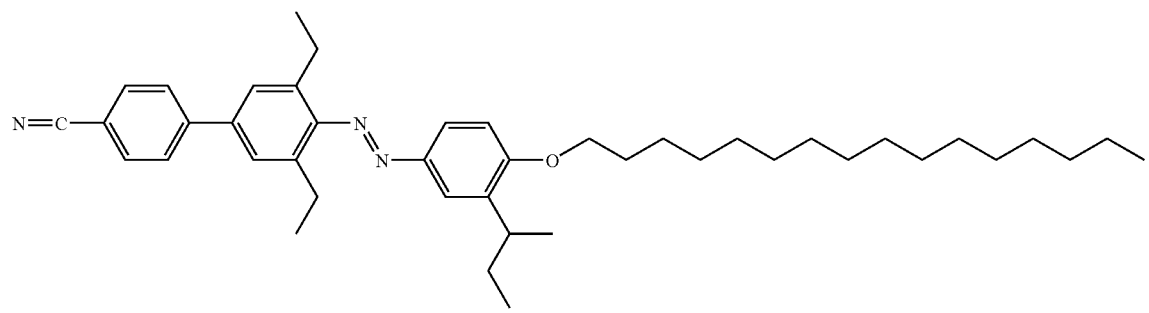
(4)
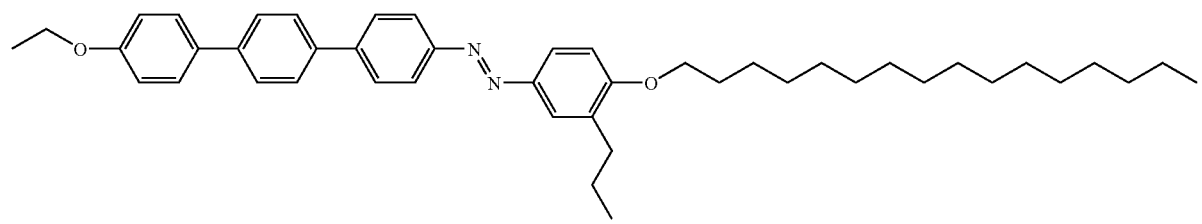
(5)
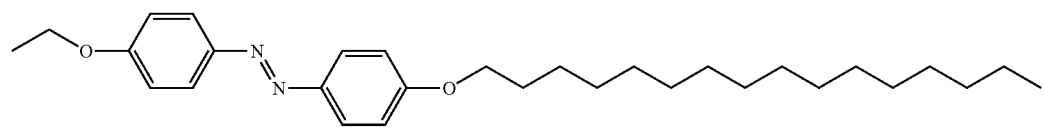
(6)
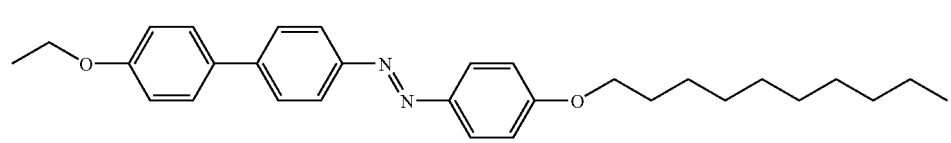
(7)

Azobenzene Derivative 2:

$^1$H NMR (270 MHz, CDCl$_3$) δ 0.86 (tt, 6H, CH$_3$), 1.16-1.87 (m, 42H, CH$_2$ and CH$_3$), 2.74 (q, 4H, ArCH$_2$CH$_3$), 3.17 (m, 1H, ArOCH(CH$_3$)CH$_2$CH$_3$), 4.01-4.11 (tq, 4H, ArOCH$_2$CH$_3$ and ArOCH$_2$), 6.93-6.99 (m, 3H, Ar—H), 7.38 (s, 2H, Ar—H), 7.54-7.77 (m, 8H, Ar—H).

Anal. Calcd: C, 82.14; H, 9.65; N, 3.69. Found: C, 81.95; H, 9.77; N, 3.69.

Azobenzene Derivative 3:

$^1$H NMR (270 MHz, CDCl$_3$) δ 0.81 (t, 3H, CH$_3$), 1.08-1.78 (m, 37H, CH$_2$ and CH$_3$), 2.67 (q, 4H, ArCH$_2$CH$_3$), 3.94-4.05 (tq, 4H, ArOCH$_2$CH$_3$ and ArOCH$_2$), 6.87-6.95 (m, 4H, Ar—H), 7.17-7.82 (m, 6H, Ar—H).

Azobenzene Derivative 4:

$^1$H NMR (270 MHz, CD$_2$Cl$_2$) δ 0.88 (tt, 6H, CH$_3$), 1.14-1.86 (m, 39H, CH$_2$ and CH$_3$), 2.70 (q, 4H, ArCH$_2$CH$_3$), 3.16 (m, 1H, ArOCH(CH$_3$)CH$_2$CH$_3$), 4.04 (t, 2H, ArOCH$_2$CH$_3$), 6.96 (d, 1H, Ar—H), 7.33 (s, 2H, Ar—H), 7.71-7.78 (m, 6H, Ar—H)

Anal. Calcd: C, 81.21; H, 9.67; N, 6.61. Found: C, 81.19; H, 9.64; N, 6.45.

Azobenzene Derivative 5:

$^1$H NMR (270 MHz, CD$_2$Cl$_2$) δ 0.87 (t, 3H, CH$_3$), 0.98 (t, 3H, CH$_3$), 1.24-1.87 (m, 33H, CH$_2$ and CH$_3$), 2.66 (t, 2H, ArCH$_2$CH$_2$CH$_3$), 4.01-4.11 (tq, 4H, ArOCH$_2$), 6.90-6.99 (m, 3H, Ar—H), 7.55-7.81 (m, 10H, Ar—H), 7.93 (d, 2H, Ar—H)

Anal. Calcd: C, 81.77; H, 9.15; N, 4.24. Found: C, 81.75; H, 9.23; N, 4.22.

Azobenzene Derivative 6:

$^1$H NMR (270 MHz, CDCl$_3$) δ 0.87 (t, 3H, CH$_3$), 1.28-1.54 (m, 29H, CH$_2$ and A rOCH$_2$CH$_3$), 1.80 (m, 2H, ArOCH$_2$CH$_2$), 4.01 (t, 2H, ArOCH$_2$), 4.09 (q, 2H, ArOCH$_2$), 6.97 (d, 4H, Ar—H), 7.84 (d, 4H, Ar—H).

Anal. Calcd: C, 77.21; H, 9.93; N, 6.00. Found: C, 77.15; H, 9.86; N, 5.95.

Azobenzene Derivative 7:

$^1$H NMR (270 MHz, CD$_2$Cl$_2$) δ 0.88 (t, 3H, CH$_3$), 1.28-1.52 (m, 17H, CH$_2$ and CH$_3$), 1.81 (m, 2H, CH$_2$), 4.02-4.12 (tq, 4H, ArOCH$_2$), 6.97-7.04 (m, 4H, Ar—H), 7.62 (d, 2H, Ar—H), 7.69 (d. 2H, Ar—H), 7.89-7.94 (m, 4H, Ar—H).

2. Formation of Particles

Each of the azobenzene derivatives synthesized in 1. above was dissolved in dichloromethane to a concentration of $4\times10^{-5}$ M. Each of the solutions was then irradiated with UV light (intensity 2 to 4 mW/cm$^2$) with a wavelength of 365 nm until the increase in fluorescence reached saturation (about 300 to 800 minutes). Observation of the solutions following irradiation with UV light by scanning electron microscopy (SEM) and transmission electron microscopy (TEM) revealed aggregates (particles) from several nm to several hundred nm in diameter in the solutions containing azobenzene derivatives 1 to 7. The crystalline lattice structures were also observed. SEM and TEM photographs of the solution containing azobenzene derivative 1 are shown in FIG. 1.

3. Confirmation of the cis Form Stability

Figure 2:
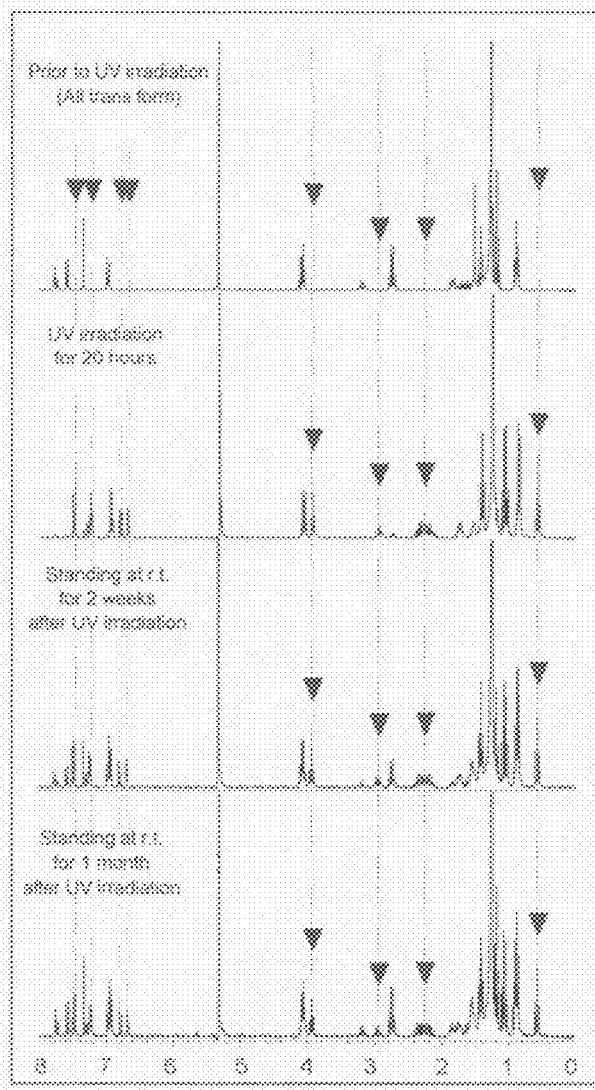
FIG. 2 shows $^1$H-NMR (in $CD_2Cl_2$) spectra of azobenzene derivative 1 prior to UV irradiation, irradiation for 20 hours, after standing at room temperature (sometimes referred to as "r.t.", hereinafter) for two weeks following UV irradiation, and after standing for one month.

FIG. 2 shows $^1$H-NMR (in CD$_2$Cl$_2$) spectra of azobenzene derivative 1 synthesized in 1. above prior to irradiation with UV light (wavelength 365 nm), after 20 hours of irradiation (aggregate), after standing at room temperature for 2 weeks following irradiation with UV light, and after standing at room temperature for one month. In the spectra of FIG. 2, the peaks indicated by the arrows are peaks derived from the cis form. As shown in FIG. 2, the fact that cis-form derived peaks appeared in the spectra after 20 hours of irradiation with UV light confirmed that irradiation with UV light had caused isomerization from the trans form to the cis form. The fact that peaks derived from the cis form were maintained in the spectra taken after standing for two weeks and one month at room temperature revealed that cis stability was high in the aggregate of azobenzene derivative 1.

Figure 10:
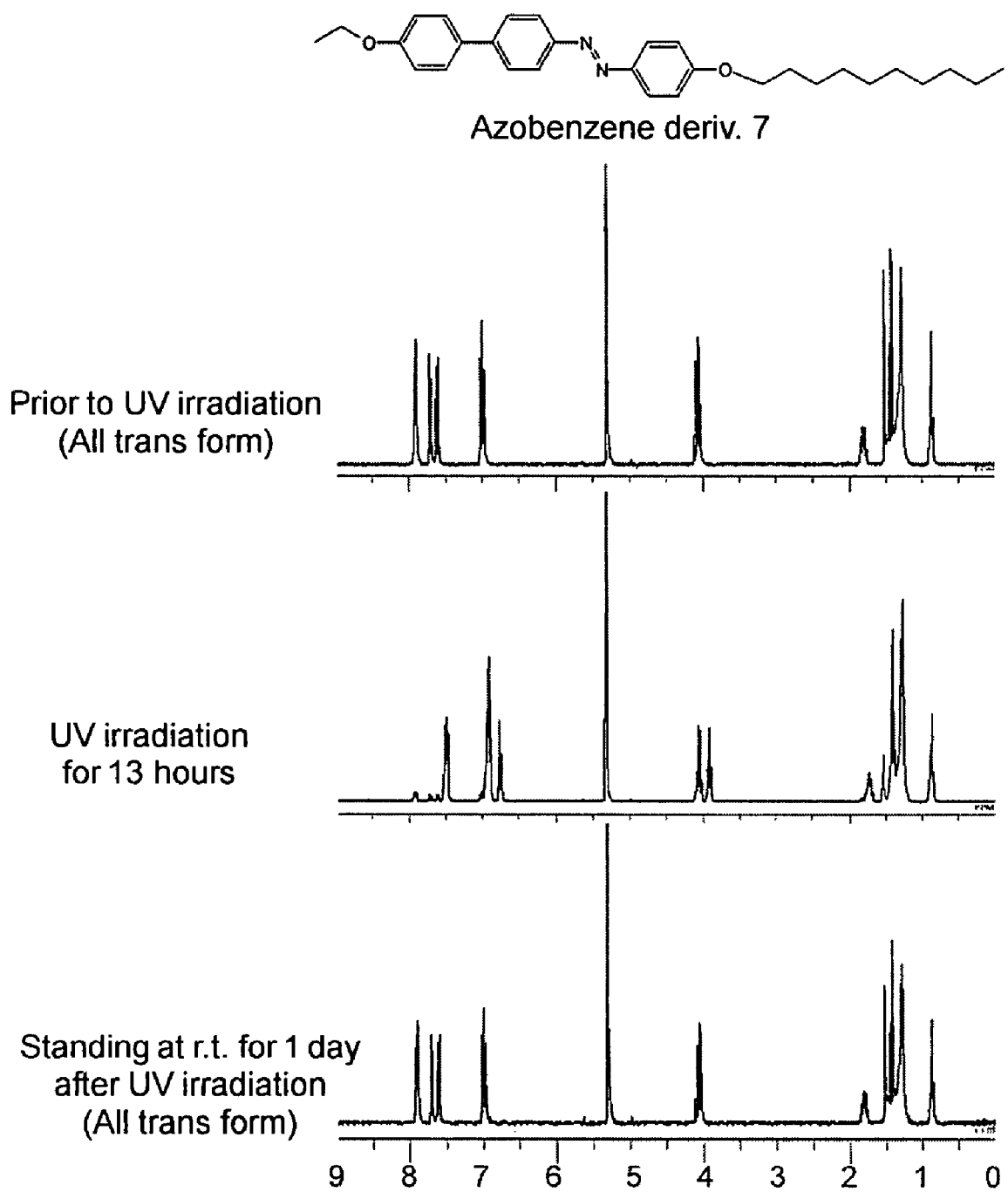
FIG. 10 shows $^1$H-NMR (in $CD_2Cl_2$) spectra of azobenzene derivative 7 measured prior to UV irradiation, irradiation for 13 hours, after standing in a dark room at room temperature for one day following UV irradiation.

FIG. 10 shows $^1$H-NMR (in CD$_2$Cl$_2$) spectra measured for azobenzene derivative 7 prior to irradiation with UV light (wavelength 365 nm), after 13 hours of irradiation (aggregate), and after standing in a dark room at room temperature for one day after having been irradiated with UV light. The fact that all of the cis form isomerized into trans form when azobenzene derivative 7 was placed in a dark room for one day following irradiation with UV light was confirmed from the NMR data presented in FIG. 10. This indicated that an azobenzene derivative with high cis stability was obtained by introducing substituents at prescribed positions.

4. Observation of Absorption and Fluorescence Emission Spectra

Figure 3:
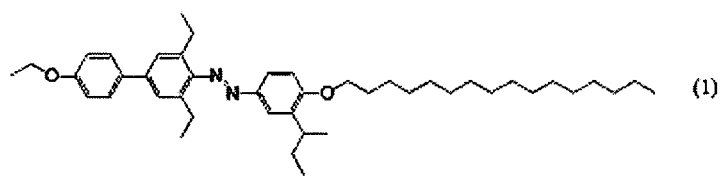
FIG. 3 shows absorption spectra and fluorescence emission spectra of a solution containing azobenzene derivative 1 prior to the start of UV irradiation, irradiation for 3 minutes, irradiation for 78 minutes, after standing at room temperature for two weeks, and after standing at room temperature for one month.
Figure 3:
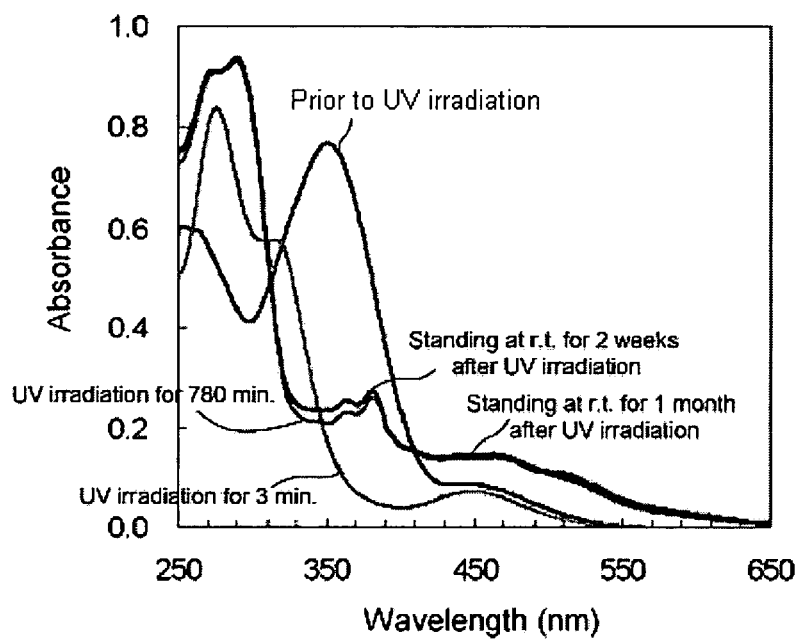
Figure 3:
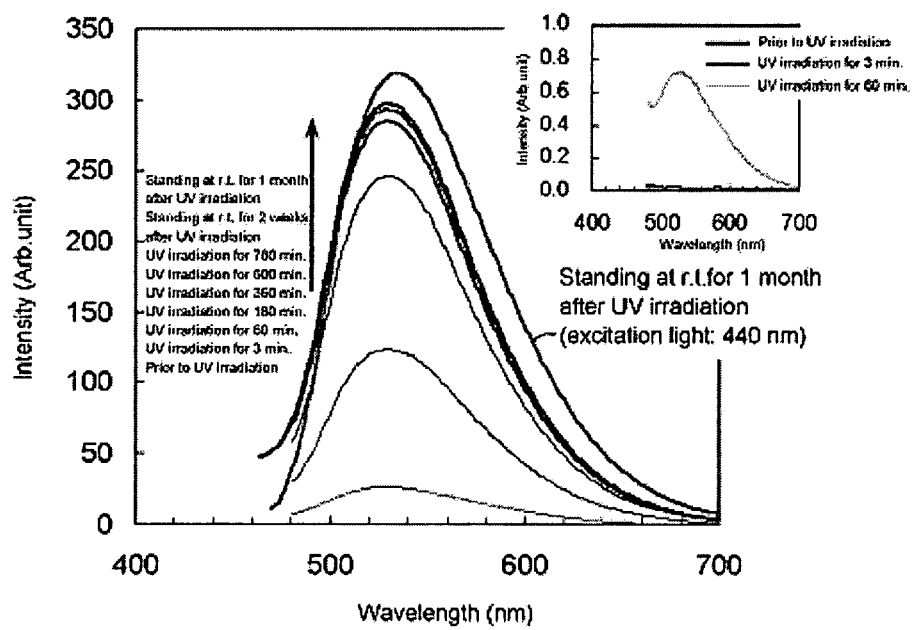
Figure 4:
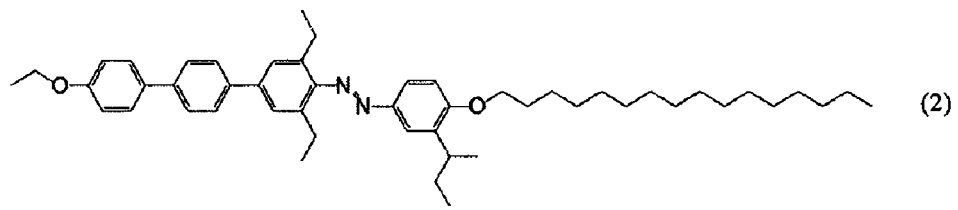
FIG. 4 shows absorption spectra and fluorescence emission spectra of a solution containing azobenzene derivative 2 prior to the start of UV irradiation, during irradiation, and after standing at room temperature.
Figure 4:
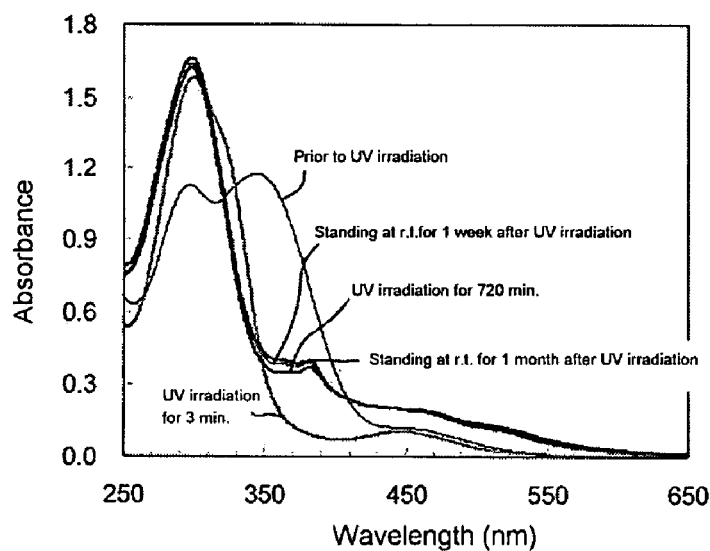
Figure 4:
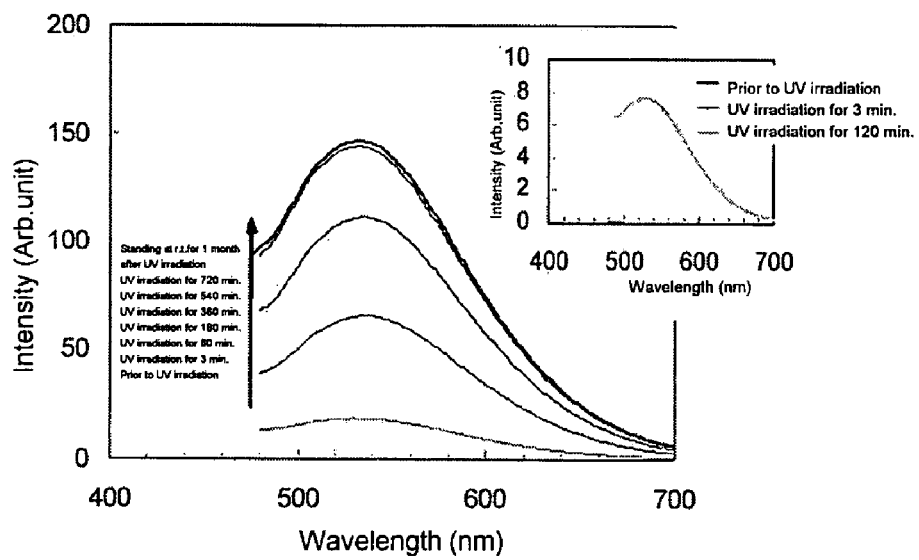
Figure 5:
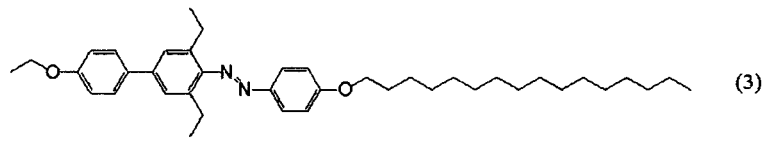
FIG. 5 shows absorption spectra and fluorescence emission spectra of a solution containing azobenzene derivative 3 prior to the start of UV irradiation, during irradiation, and after standing at room temperature.
Figure 5:
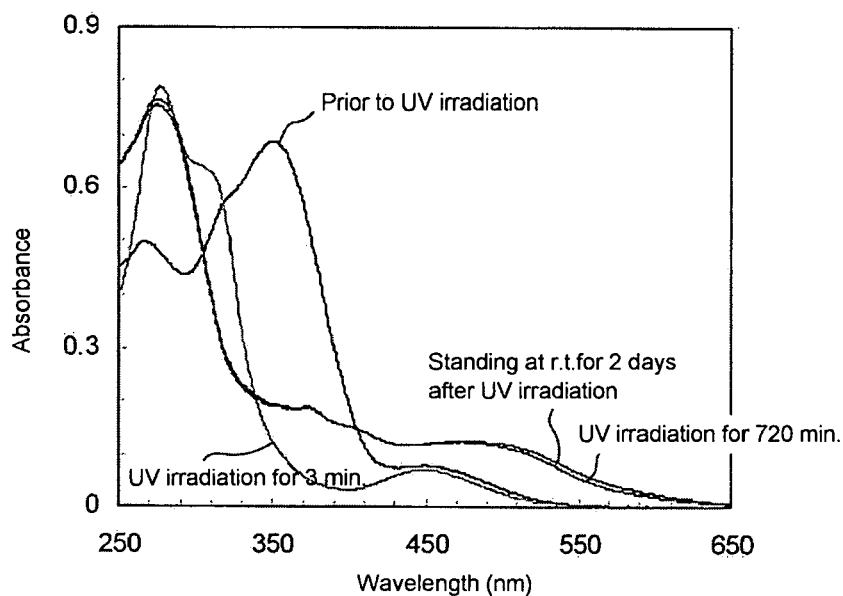
Figure 5:
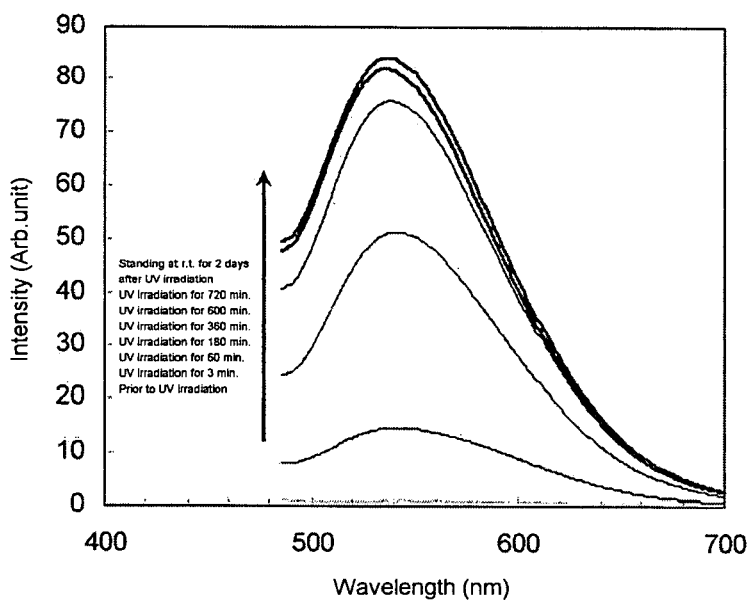
Figure 6:
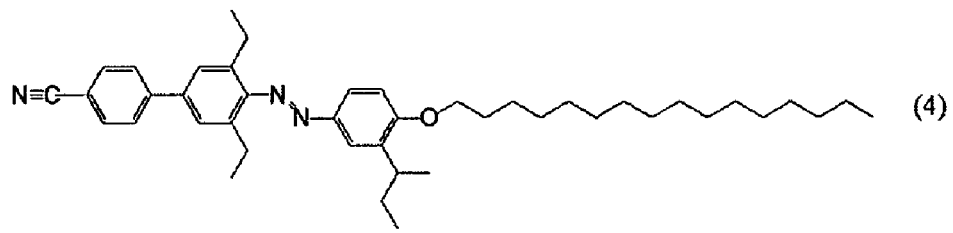
FIG. 6 shows absorption spectra and fluorescence emission spectra of a solution containing azobenzene derivative 4 prior to the start of UV irradiation, during irradiation, and after standing at room temperature.
Figure 6:
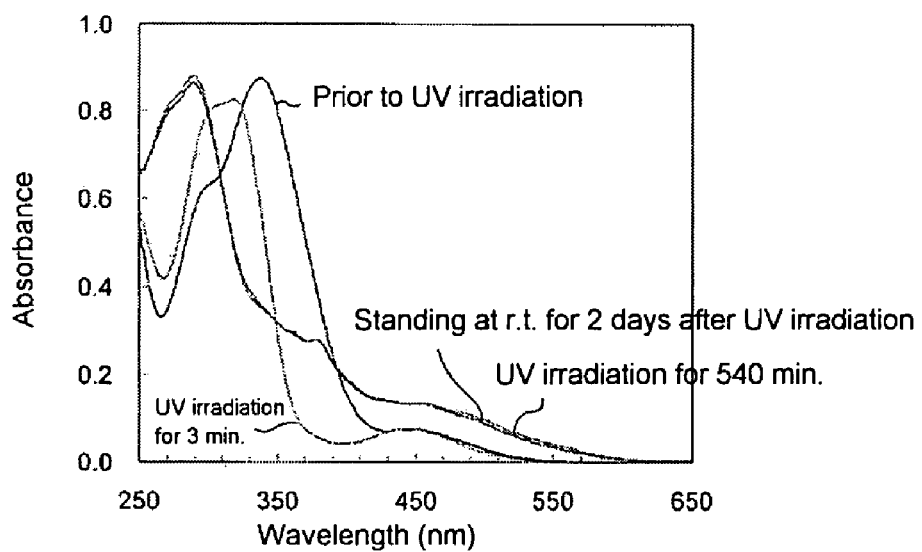
Figure 6:
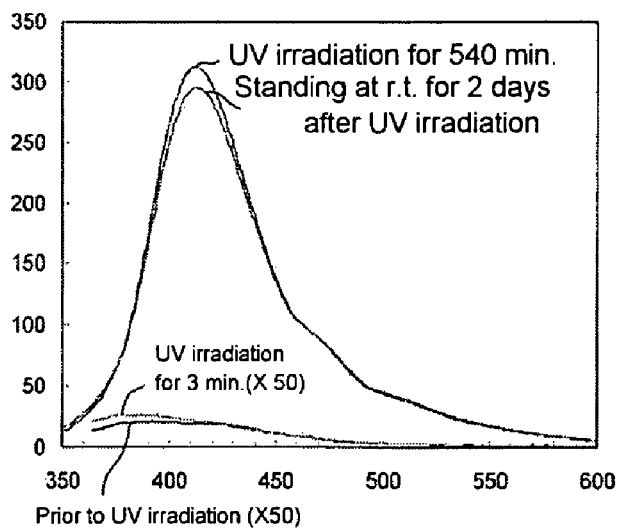
Figure 7:
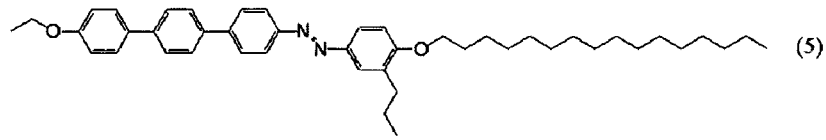
FIG. 7 shows absorption spectra and fluorescence emission spectra of a solution containing azobenzene derivative 5 prior to the start of UV irradiation, during irradiation, and after standing at room temperature.
Figure 7:
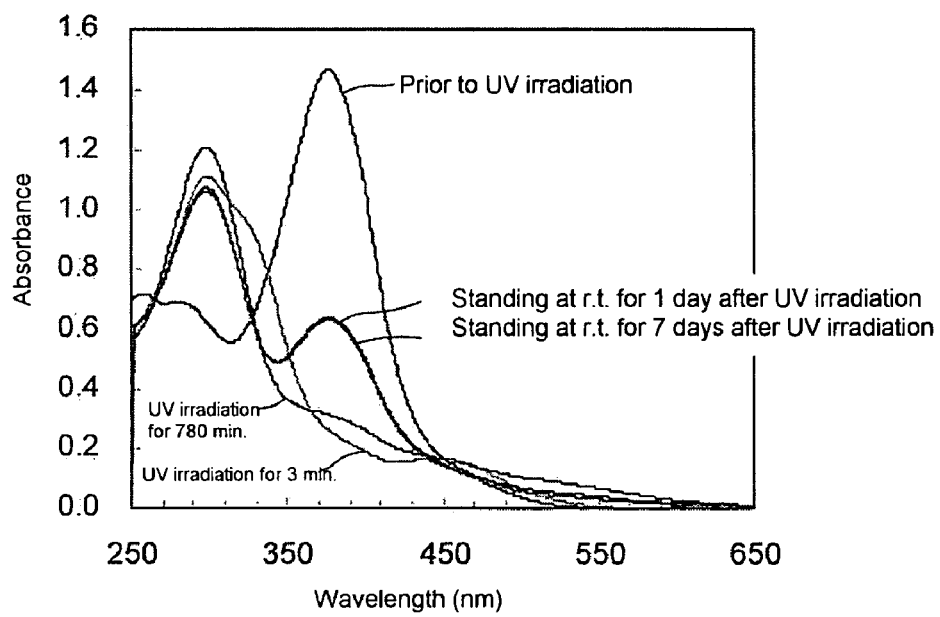
Figure 7:
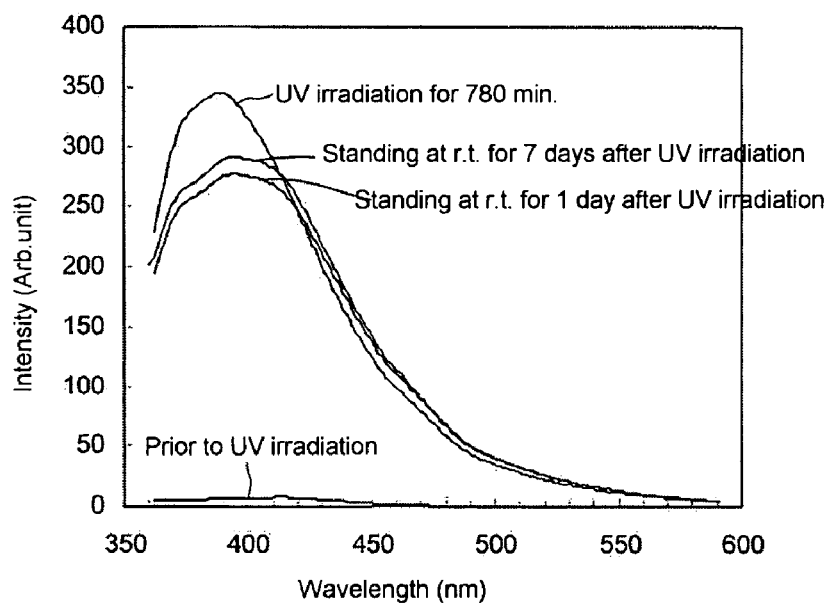
Figure 8:
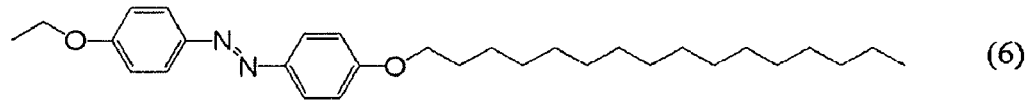
FIG. 8 shows absorption spectra and fluorescence emission spectra of a solution containing azobenzene derivative 6 prior to the start of UV irradiation, during irradiation, and after standing at room temperature.
Figure 8:
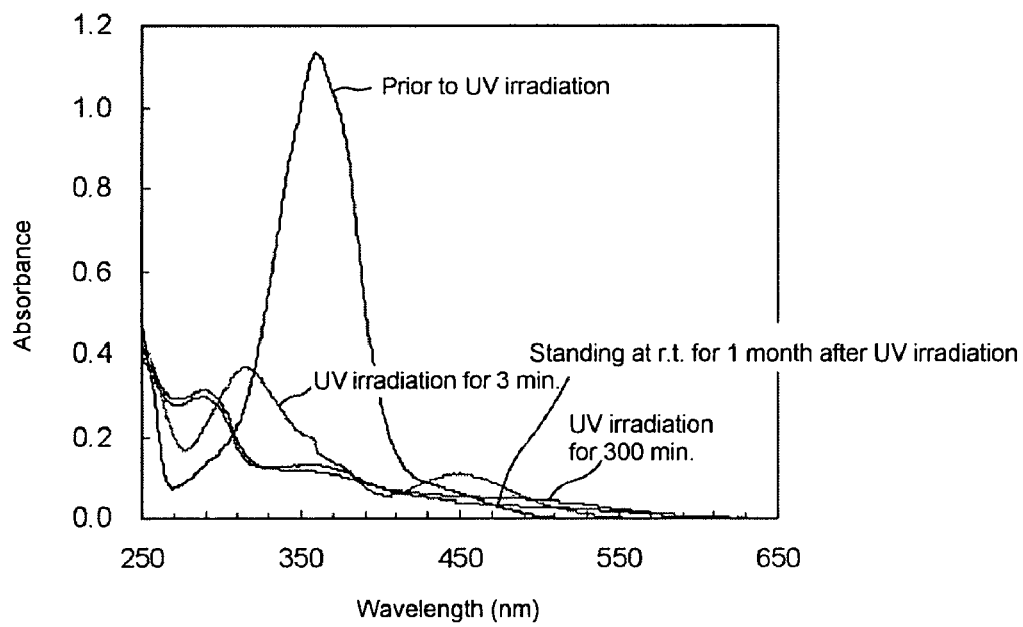
Figure 8:
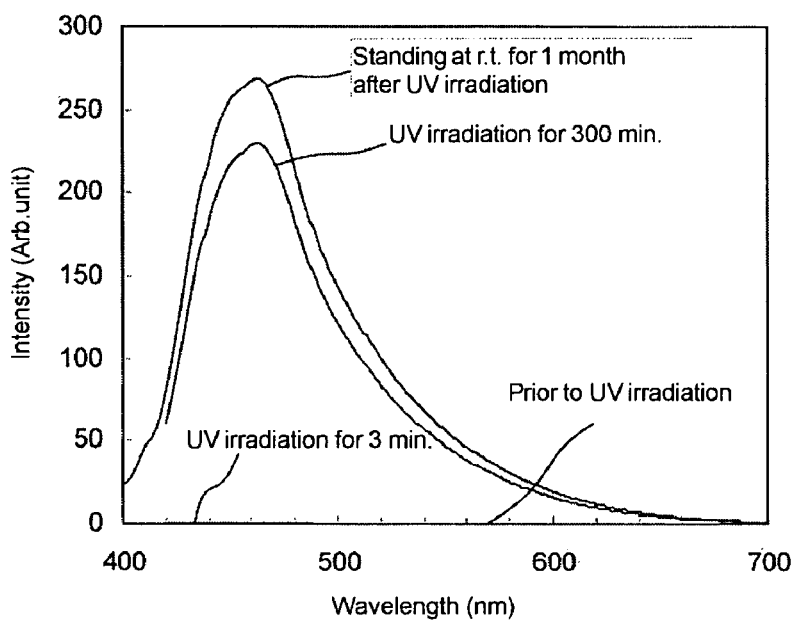
Figure 9:
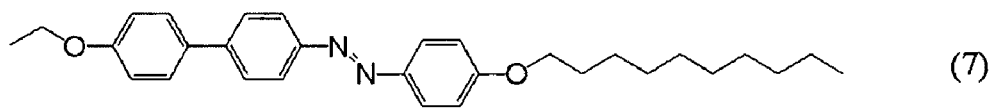
FIG. 9 shows absorption spectra and fluorescence emission spectra of a solution containing azobenzene derivative 7 prior to the start of UV irradiation, during irradiation, and after standing at room temperature.
Figure 9:
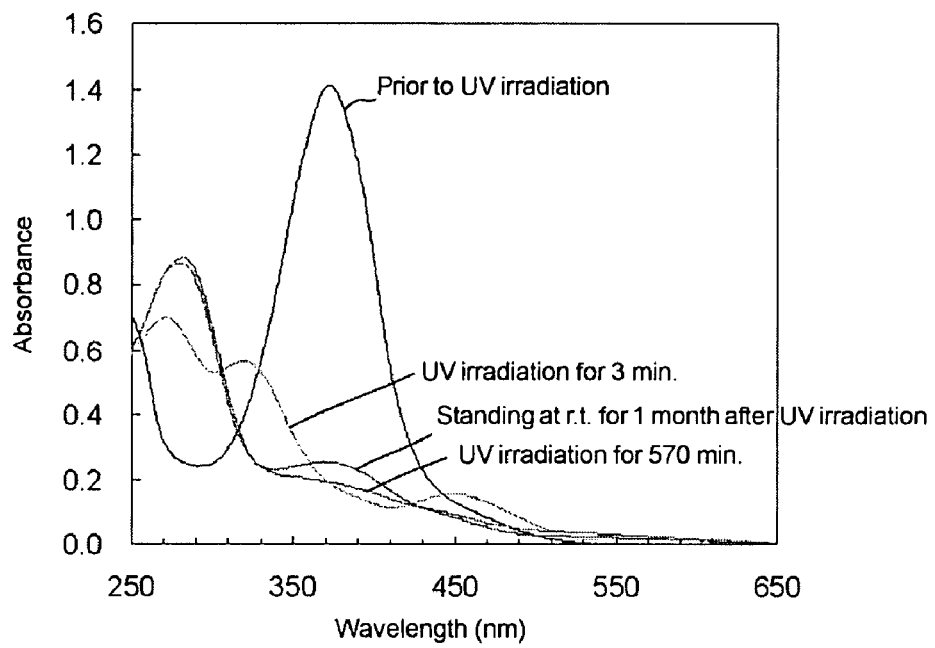
Figure 9:
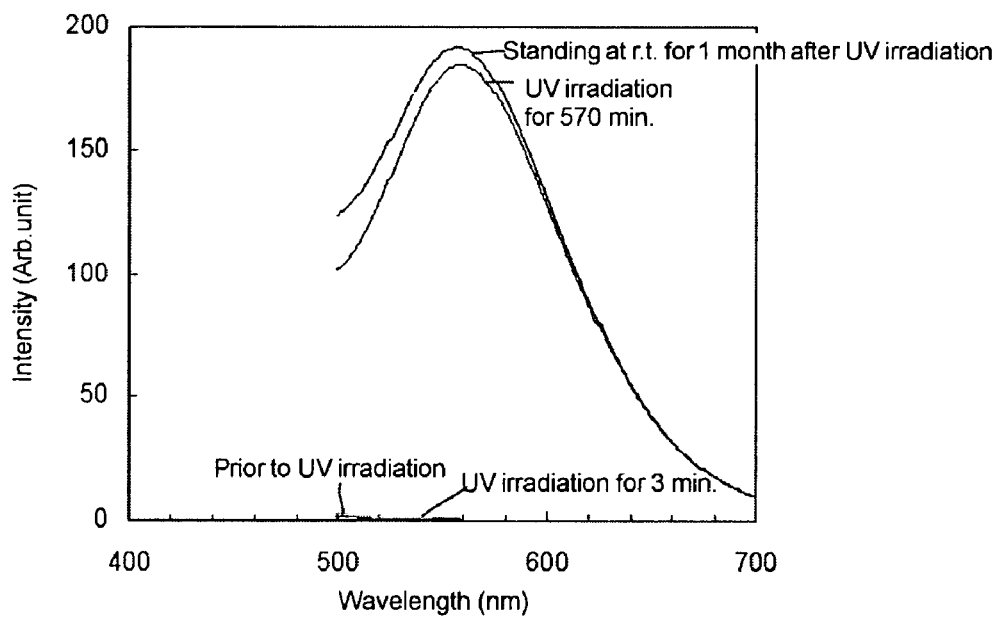

Employing the same method as in 2. above, a solution containing azobenzene derivative 1 was irradiated for 780 minutes with UV light (wavelength 365 nm) and then placed for one month at room temperature in a dark room. FIG. 3(a) shows absorption spectra and FIG. 3 (b) shows fluorescence emission spectra obtained prior to the start of irradiation of the solution containing azobenzene derivative 1 with UV light, after 3 minutes of irradiation, after 780 minutes, after 2 weeks of standing at room temperature, and after one month of standing at room temperature.

Employing the same method as in 2. above, solutions containing azobenzene derivatives 2 to 7 were irradiated with UV light (wavelength 365 nm) until the increase in fluorescence reached saturation (about 300 to 800 minutes), and then placed at room temperature in a dark room. FIGS. 4 to 9 show absorption spectra and fluorescence emission spectra for each solution prior to the start of UV irradiation, during irradiation, and after standing at room temperature.

Table shows the change in intensity of fluorescence and the $\lambda_{max}$ of the fluorescence emission spectra of each of the solutions (i) after irradiation with UV light and (ii) after standing at room temperature following irradiation with UV light.

In these fluorescence emission spectra, the UV light irradiated (wavelength 365 nm) served as excitation light for emission.

TABLE 1

| | λmax | | |
|---|---|---|---|
| | (i)After irradiation with UV light (Time required to saturate fluorescence increase is indicated in parentheses.) | (ii)After standing in a dark room at room temperature (Standing tune is indicated in parentheses.) | Change in fluorescence intensity |
| Azobenzene derivative 1 | 529(780 min.) | 530(One month) | 0.017 |
| Azobenzene derivative 2 | 534(720 min.) | 533(One month) | 0.014 |
| Azobenzene derivative 3 | 538(720 min.) | 538(Two days) | 0.024 |
| Azobenzene derivative 4 | 412(540 min.) | 413(Two days) | −0.053 |
| Azobenzene derivative 5 | 389(780 min.) | 395(One week) | −0.16 |
| Azobenzene derivative 6 | 463(300 min.) | 463(One month) | 0.17 |

TABLE 1-continued

| | λmax | | |
|---|---|---|---|
| | (i)After irradiation with UV light (Time required to saturate fluorescence increase is indicated in parentheses.) | (ii)After standing in a dark room at room temperature (Standing time is indicated in parentheses.) | Change in fluorescence intensity |
| Azobenzene derivative 7 | 558(570 min.) | 557(One month) | 0.49 |

Change in fluorescence intensity = {(fluorescence intensity of (ii))/(fluorescence intensity of (i))}/fluorescence intensity of (i)

As shown in FIGS. 3 to 6, the solutions containing azobenzene derivatives 1 to 4 exhibited almost no change in the absorption spectra, fluorescence wavelength and fluorescence intensity before and after irradiation with UV light. This revealed that azobenzene derivatives 1 to 4 had good cis stability and emitted fluorescence that was stable over an extended period. The change observed in the spectra taken three minutes after irradiation with UV light relative to the spectra taken prior to irradiation with UV light was due to the change from the trans to the cis form. The change observed in the spectra taken after extended irradiation (about 300 to 800 minutes) relative to the spectra taken after three minutes of irradiation with UV light was caused by the formation of aggregates.

By contrast, there was a large change in absorption spectra when the solutions containing azobenzene derivatives 5 to 7 were placed at room temperature in a dark location following irradiation with UV light. This was due to isomerization from the cis form to the trans form within aggregates. There was a large change in fluorescence intensity before and after irradiation with UV light in these solutions, and there was a large change in the fluorescence wavelength in the solution containing azobenzene derivative 5.

As revealed from the differences in the $\lambda_{max}$ values indicated in Table 1, the solutions containing azobenzene derivatives 1 to 4 emitted fluorescence of different colors. In this manner, the color of the fluorescence of the azobenzene derivatives of the present invention can be changed by changing the type and number of substituents introduced into the azobenzene skeleton.

5. Change in Color of Fluorescence Based on Differences in Excitation Light (1) Confirmation of the Color of Fluorescence of Azobenzene Derivative 1

Using the same method as in 2. above, a solution containing azobenzene derivative 1 was irradiated for 780 minutes with UV light (wavelength 365 nm). The solution was then irradiated with excitation light in the form of light with wavelengths of 365 nm, 435 nm, and 500 nm.

Figure 11:
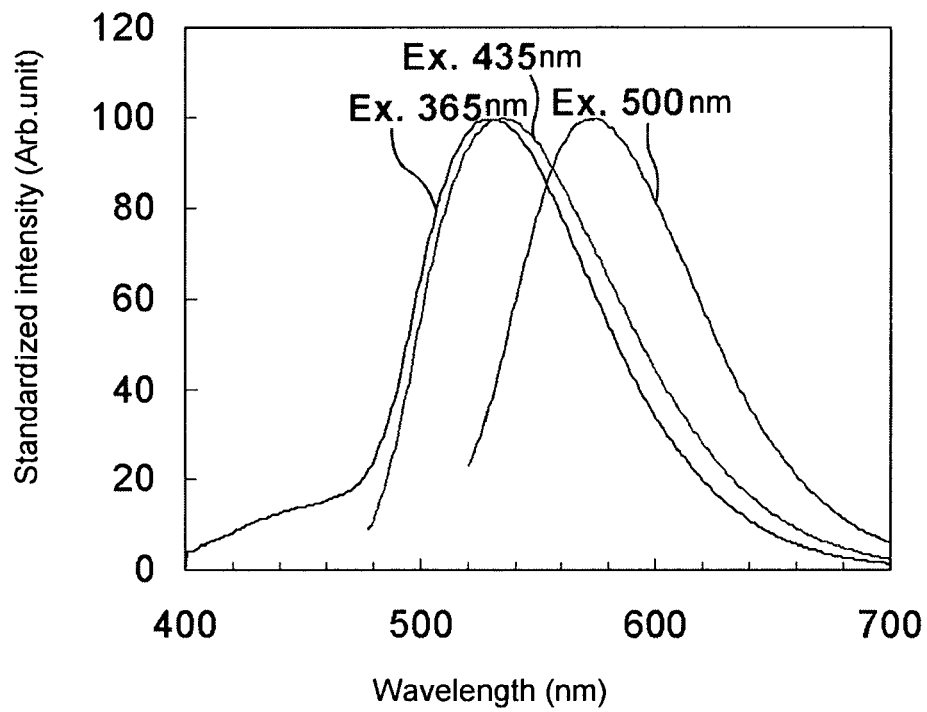
FIG. 11 shows a fluorescence emission spectrum of fluorescent particles formed by azobenzene derivative 1.
Figure 11:
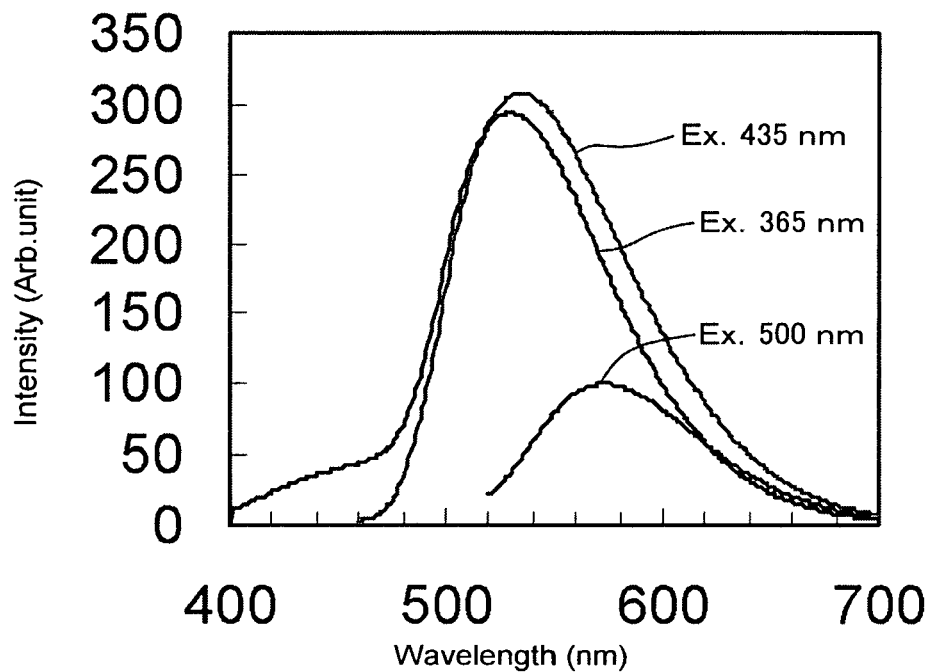

The fluorescence emission spectra obtained are given in FIG. 11. The upper portions of FIG. 11 show the spectral intensities of the lower portions of FIG. 11 in standardized form.

As indicated in FIG. 11, yellow-green fluorescence was obtained for excitation by light having wavelengths of 365 nm and 435 nm; red fluorescence was obtained for excitation by light having a wavelength of 500 nm.

(2) Confirmation of the Color of Fluorescence of Azobenzene Derivatives 8 and 9

Azobenzene derivatives 8 and 9 were synthesized by varying the starting compound and the like in the method of synthesizing azobenzene derivative 1.

Azobenzene Derivative 8:

$^1$H NMR (270 MHz, CD$_2$Cl$_2$) δ 0.81 (m, 6H, C$\underline{H}_3$), 1.19-1.79 (m, 36H, C$\underline{H}_2$ and C$\underline{H}_3$), 2.30 (s, 3H, ArC$\underline{H}_3$), 3.06 (m, 1H, ArOC$\underline{H}$(CH$_3$)CH$_2$CH$_3$), 4.01 (m, 4H, ArOC$\underline{H}_2$CH$_3$), 6.85-7.74 (m, 10H, Ar—$\underline{H}$)

Azobenzene Derivative 9:

$^1$H NMR (270 MHz, CD$_2$Cl$_2$) δ 0.85 (t, 3H, C$\underline{H}_3$), 1.07-1.86 (m, 26H, C$\underline{H}_2$ and C$\underline{H}_3$), 2.19 (s, 3H, MHCOC$\underline{H}_3$), 2.72 (t, 4H, ArC$\underline{H}_2$CH$_3$), 3.34 (m, 1H, ArOC$\underline{H}$(CH$_3$)CH$_2$CH$_3$), 4.05 (m, 4H, ArOC$\underline{H}_2$CH$_3$), 6.92-7.82 (m, 9H, Ar—$\underline{H}$)

The excitation light was varied by the same method as set forth above to confirm changes in the color of fluorescence of the azobenzene derivatives 8 and 9 thus obtained and azobenzene derivative 4, obtained by the above-described method. The fluorescence emission spectra obtained are given in FIGS. 12 to 14.

Figure 12:
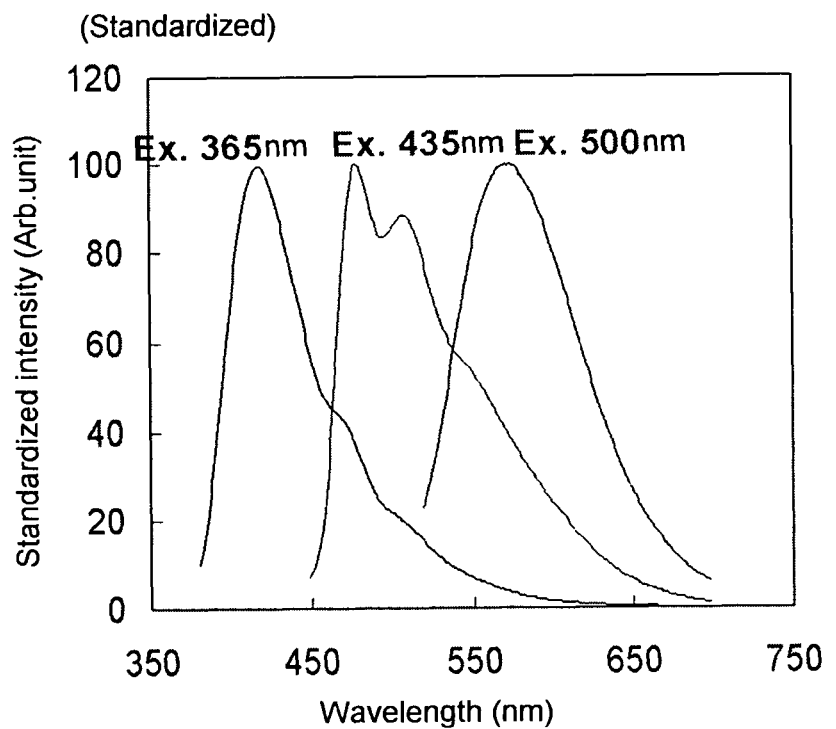
FIG. 12 shows a fluorescence emission spectrum of fluorescent particles formed by azobenzene derivative 4.
Figure 12:
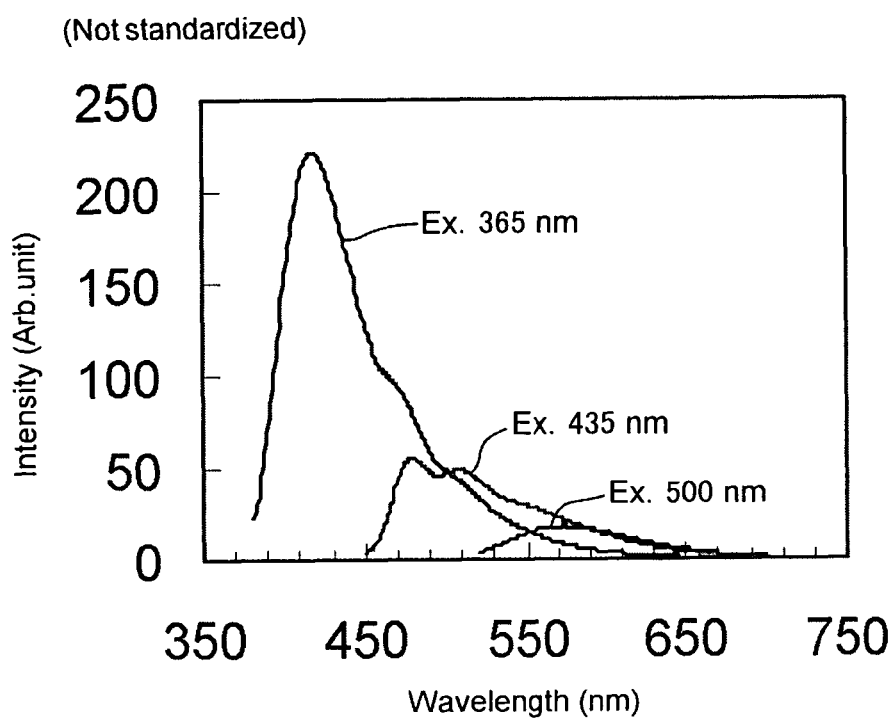

As shown in FIG. 12, azobenzene derivative 4 exhibited blue fluorescence when excited with light having a wavelength of 365 nm, green fluorescence when excited with light having a wavelength of 435 nm, and red fluorescence when excited with light having a wavelength of 500 nm.

Figure 13:
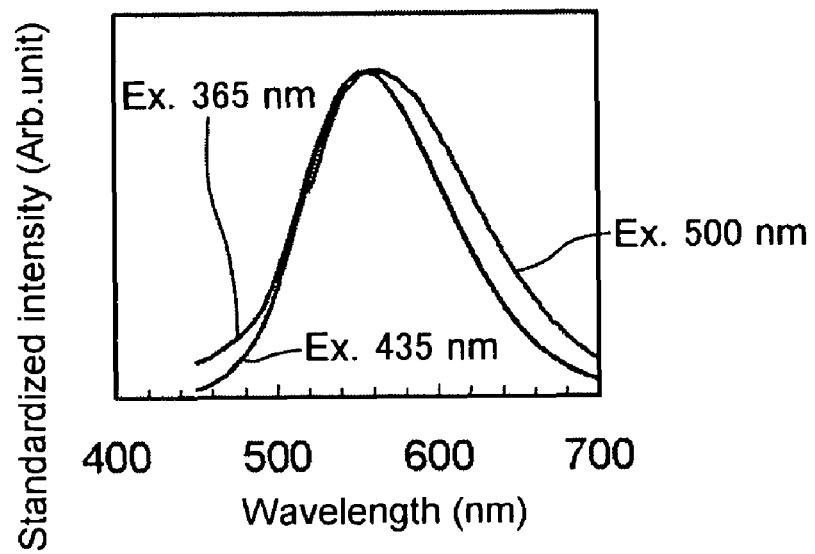
FIG. 13 shows a fluorescence emission spectrum of fluorescent particles formed by azobenzene derivative 8.
Figure 13:
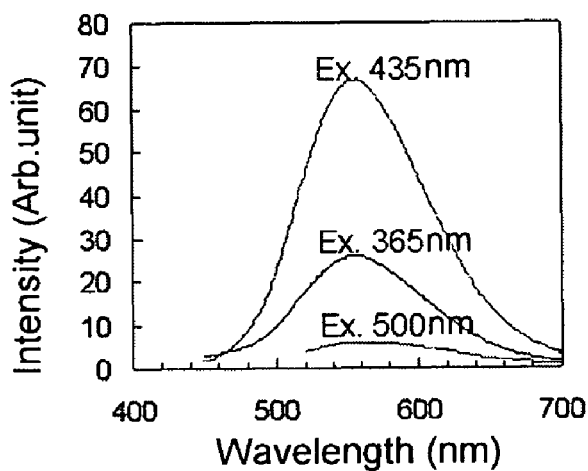

As shown in FIG. 13, azobenzene derivative 8 exhibited yellow fluorescence when excited with excitation light having wavelengths of 365 nm, 435 nm, and 500 nm.

Figure 14:
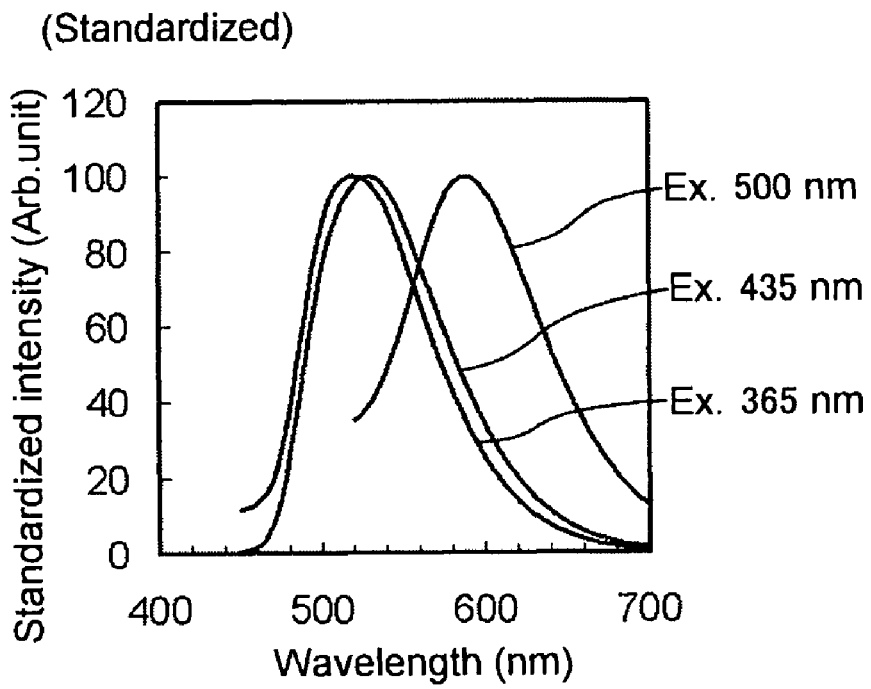
FIG. 14 shows a fluorescence emission spectrum of fluorescent particles formed by azobenzene derivative 9.
Figure 14:
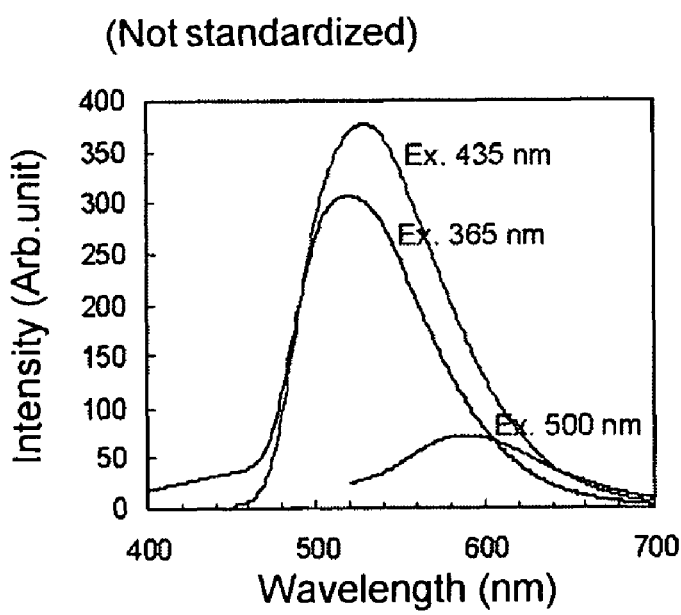

As shown in FIG. 14, azobenzene derivative 9 exhibited yellow-green fluorescence when excited with light having wavelengths of 365 nm and 435 nm, and red fluorescence when excited with light having a wavelength of 500 nm.

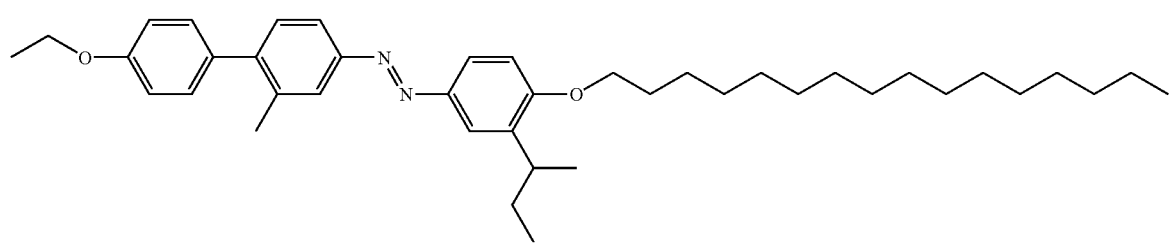

(8)

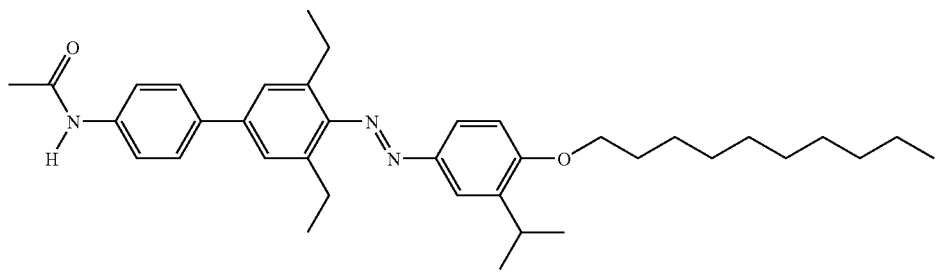

(9)

(3) Confirmation of the Color of Fluorescence of Azobenzene Derivatives 10 to 16

Azobenzene derivatives 10 to 15 were synthesized by varying the starting compounds and the like in the method of synthesizing azobenzene derivative 1. In the schematic shown below, "X" denotes a substituent in moiety $R^1$ of the corresponding azobenzene derivative. The starting compounds and the like were also varied to synthesize azobenzene derivative 16.

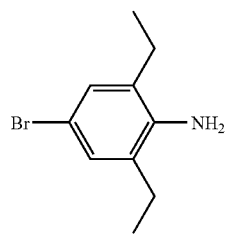

1) HCl, NaNO$_2$, 0-5° C.
2) 2-isopropylphenol

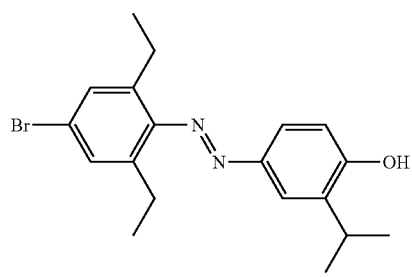

Br—(CH$_2$)$_9$—CH$_3$
K$_2$CO$_3$/Bu$_4$NBr
acetone

-continued
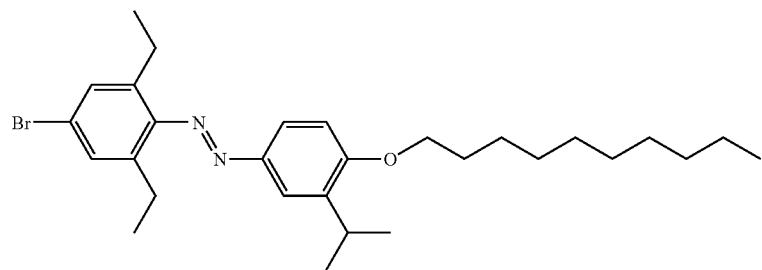
1) Pd(PPh$_3$)$_4$
2) X—⟨ ⟩—B(OH)$_2$
3) 2M NaHCO$_3$
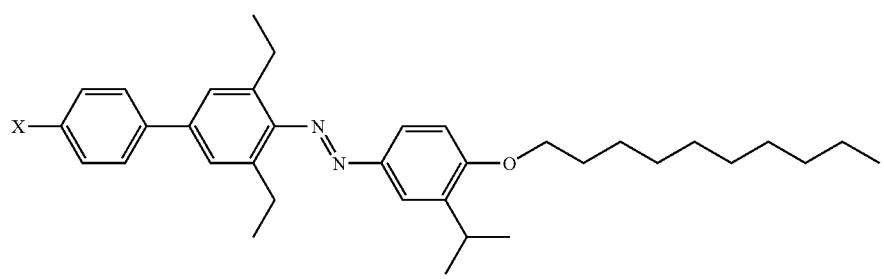
(10)
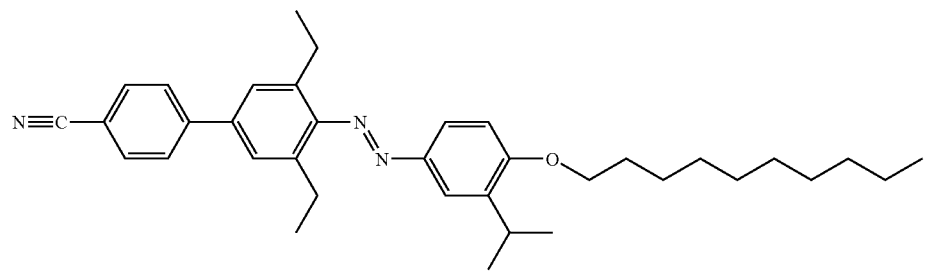
(11)
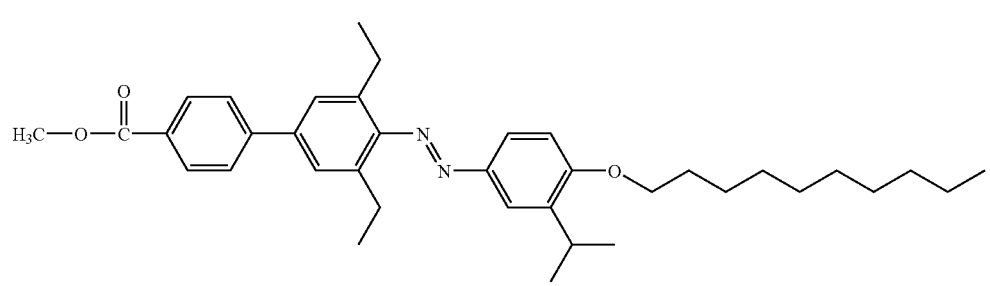
(12)
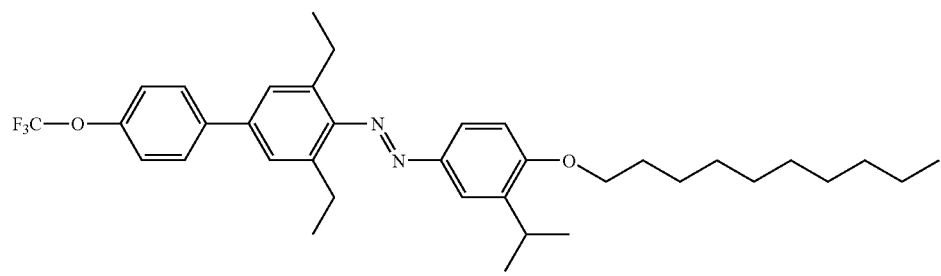

-continued

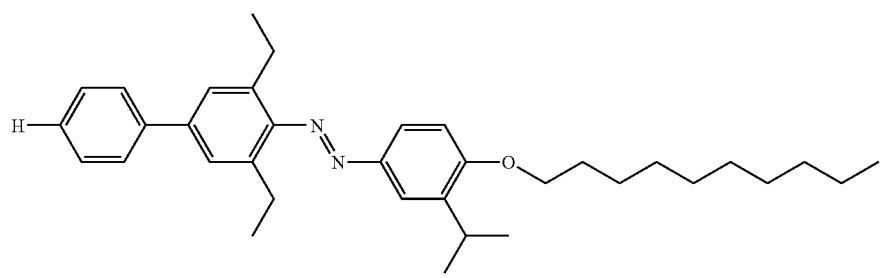
(13)

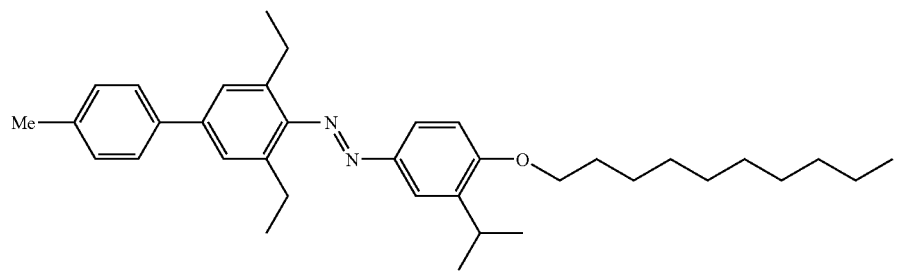
(14)

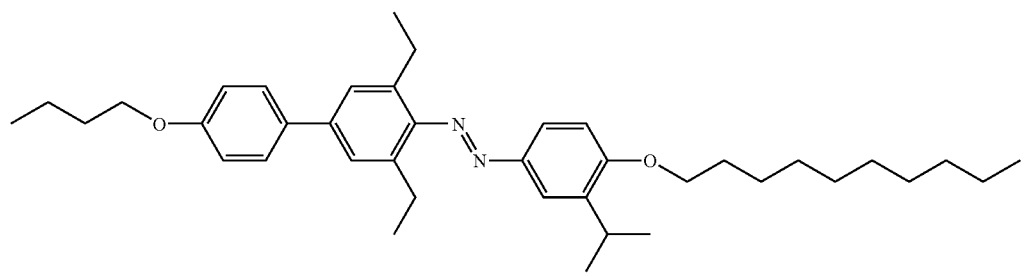
(15)

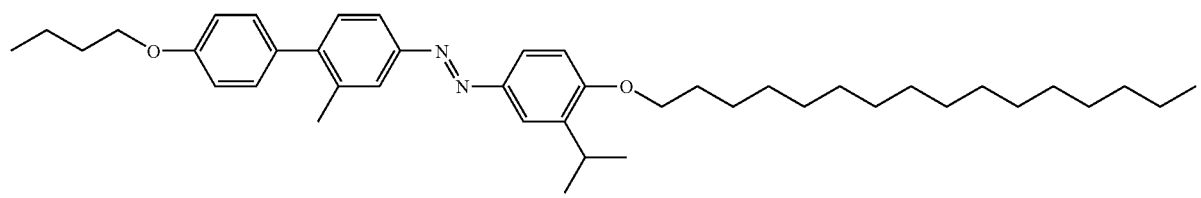
(16)

Identification results of azobenzene derivatives 10 to 16 are shown below.

Azobenzene Derivative 10: 1H NMR (270 MHz, CDCl$_3$) δ 0.81 (t, 3H, CH$_3$), 1.09-1.49 (m, 26H, CH$_2$ and CH$_3$), 1.79 (m, 2H, CH$_2$), 2.65 (q, 4H, ArCH$_2$CH$_3$), 3.28 (m, 1H, ArOCH(CH$_3$)$_2$), 4.00 (t, 2H, ArOCH$_2$), 6.87 (d, 1H, Ar—H), 7.18-7.77 (m, 8H, Ar—H).

Azobenzene Derivative 11: 1H NMR (270 MHz, CDCl$_3$) δ 0.85 (t, 3H, CH$_3$), 1.03-1.55 (m, 26H, CH$_2$ and CH$_3$), 1.84 (m, 2H, CH$_2$), 2.69 (q, 4H, ArCH$_2$CH$_3$), 3.37 (m, 1H, ArOCH(CH$_3$)$_2$), 3.93 (s, 3H, COOCH$_3$), 4.05 (t, 2H, ArOCH$_2$), 6.96 (d, 1H, Ar—H), 7.37 (s, 2H, Ar—H), 7.67-7.83 (m, 4H, Ar—H), 8.07 (d, 2H, Ar—H)

Azobenzene Derivative 12: 1H NMR (270 MHz, CDCl$_3$) δ 0.81 (t, 3H, CH$_3$), 0.98-1.49 (m, 26H, CH$_2$ and CH$_3$), 1.78 (m, 2H, CH$_2$), 2.65 (q, 4H, ArCH$_2$CH$_3$), 3.28 (m, 1H, ArOCH(CH$_3$)$_2$), 3.99 (t, 2H, ArOCH$_2$), 6.86 (d, 1H, Ar—H), 7.16-7.76 (m, 8H, Ar—H).

Anal. Calcd: C, 72.45; H, 7.94; N, 4.69; F, 9.55. Found: C, 72.55; H, 7.97; N, 9.53; F, 4.68

Azobenzene Derivative 13: 1H NMR (270 MHz, CDCl$_3$) δ 0.82 (t, 3H, CH$_3$), 1.02-1.48 (m, 26H, CH$_2$ and CH$_3$), 1.78 (m, 2H, CH$_2$), 2.65 (q, 4H, ArCH$_2$CH$_3$), 3.31 (m, 1H, ArOCH(CH$_3$)$_2$), 3.99 (t, 2H, ArOCH$_2$), 6.87 (d, 1H, Ar—H), 7.18-7.77 (m, 9H, Ar—H).

Azobenzene Derivative 14: 1H NMR (270 MHz, CDCl$_3$) δ 0.85 (t, 3H, CH$_3$), 1.07-1.54 (m, 26H, CH$_2$ and CH$_3$), 1.81 (m, 2H, CH$_2$), 2.38 (s, 3H, Ar—CH$_3$), 2.70 (q, 4H, ArCH$_2$CH$_3$), 3.36 (m, 1H, ArOCH(CH$_3$)$_2$), 4.05 (t, 2H, ArOCH$_2$), 6.92 (d, 1H, Ar—H), 7.22-7.82 (m, 8H, Ar—H).

Azobenzene Derivative 15: 1H NMR (270 MHz, CDCl$_2$) δ 0.88 (t, 3H, CH$_3$), 0.99 (t, 3H, CH$_3$), 1.05-1.61 (m, 28H, CH$_2$ and CH$_3$), 1.82 (m, 4H, CH$_2$), 2.74 (q, 4H, ArCH$_2$CH$_3$), 3.38 (m, 1H, ArOCH(CH$_3$)CH$_2$CH$_3$), 4.04 (m, 4H, ArOCH$_2$), 6.92-7.83 (m, 9H, Ar—H).

Anal. Calcd: C, 80.09; H, 9.65; N, 4.79. Found: C, 80.03; H, 9.75; N, 4.72.

Azobenzene Derivative 16: 1H NMR (270 MHz, CDCl$_3$) δ 0.80 (m, 6H, CH$_3$), 0.90 (t, 3H, CH$_3$), 1.17-1.78 (m, 37H, CH$_2$ and CH$_3$), 2.30 (s, 3H, ArCH$_3$), 3.10 (m, 1H, ArOCH(CH$_3$)(CH$_2$CH$_3$)), 3.94 (t, 2H, ArOCH$_2$), 6.84-7.75 (m, 10H, Ar—H).

Figure 15:
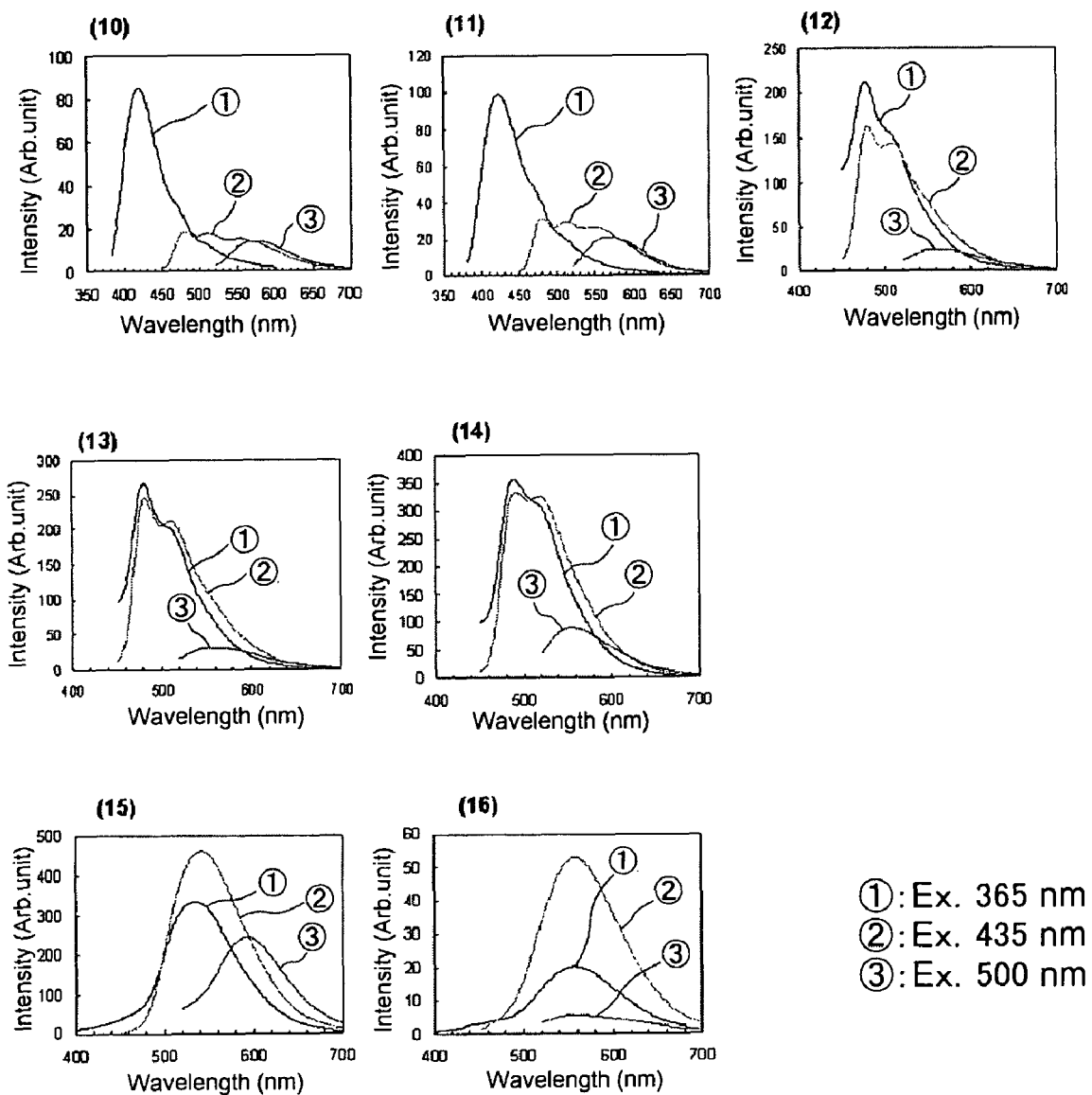
FIG. 15 shows fluorescence emission spectra of fluorescent particles formed by azobenzene derivatives 10-16.

Changes in the color of fluorescence were confirmed by varying the excitation wavelength by the same method as mentioned above for azobenzene derivatives 10 to 16. The fluorescence emission spectra obtained are shown in FIG. 15. Fluorescence was emitted at multiple excitation wavelengths by each of the azobenzene derivatives. Some of the azobenzene derivatives also exhibited fluorescence of different wavelengths (colors) when the excitation light was varied.

As set forth above, the fluorescent particles formed by the azobenzene derivatives of the present invention had multiple excitation wavelengths. In some cases, fluorescence of different wavelengths (colors) was emitted by varying the excitation wavelength. By exploiting this property, it was possible to obtain fluorescence of different colors from a single type of fluorescence particle.

6. Shifts in Fluorescence Wavelength Due to Different Substituents and the Like (1) Synthesis of Azobenzene Derivative 17

Azobenzene derivative 17 was synthesized by varying the starting compounds and the like in the above synthesis method.

Figure 16:
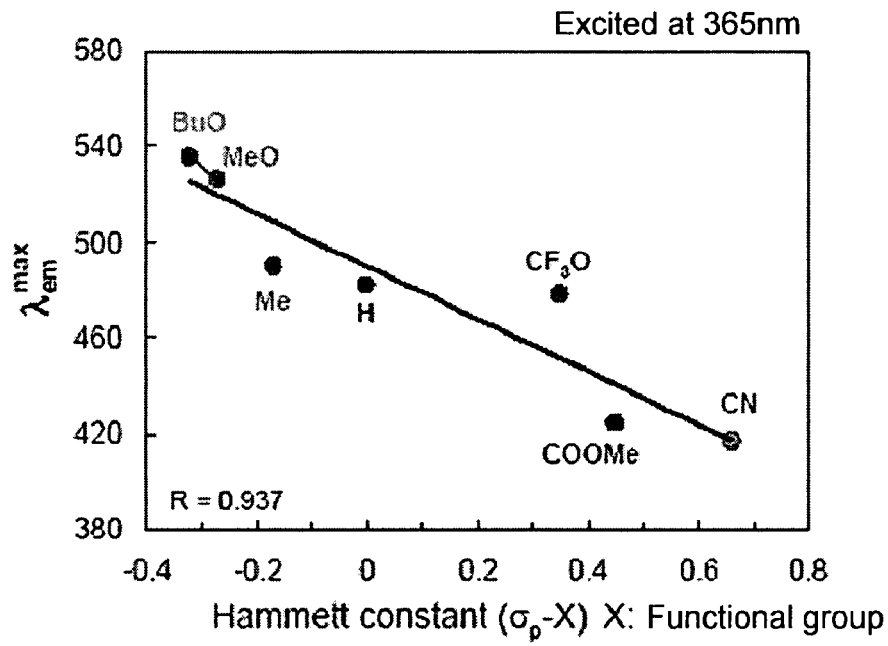
FIG. 16 shows a plot of the relation between the Hammett constant of the terminal substituents of azobenzene derivatives 10, 11, 12, 13, 14, 15, and 17 and the $\lambda$(lambda)$_{max}$ of the fluorescence obtained by irradiation with excitation light.

As is shown in FIG. 16, a linear relation was found between the Hammett constant of the terminal substituent and its $\lambda_{max}$. It is thought that this effect can be used to anticipate the color of the fluorescence obtained from the Hammett constant of the substituent.

(3) Synthesis of Azobenzene Derivatives 18 to 21

Azobenzene derivatives 18 to 21 were synthesized by varying the starting compounds and the like in the method of synthesizing azobenzene derivative 1. Identification results are given below.

Azobenzene Derivative 18: 1H NMR (270 MHz, CDCl$_3$) δ 0.85 (t, 3H, C$\underline{H}_3$), 1.07-1.54 (m, 26H, C$\underline{H}_2$ and C$\underline{H}_3$), 1.81 (m, 2H, C$\underline{H}_2$), 2.19 (s, 3H, NHCOC$\underline{H}_3$), 2.69 (q, 4H, ArC$\underline{H}_2$CH$_3$), 3.36 (m, 1H, ArOC$\underline{H}$(CH$_3$)$_2$), 4.05 (t, 2H, ArOC$\underline{H}_2$), 6.92 (d, 1H, Ar—H), 7.17-7.82 (m, 8H, Ar—$\underline{H}$).

Azobenzene Derivative 19: 1H NMR (270 MHz, CDCl$_3$) δ 0.85 (t, 3H, C$\underline{H}_3$), 1.07-1.54 (m, 26H, C$\underline{H}_2$ and C$\underline{H}_3$), 1.81 (m,

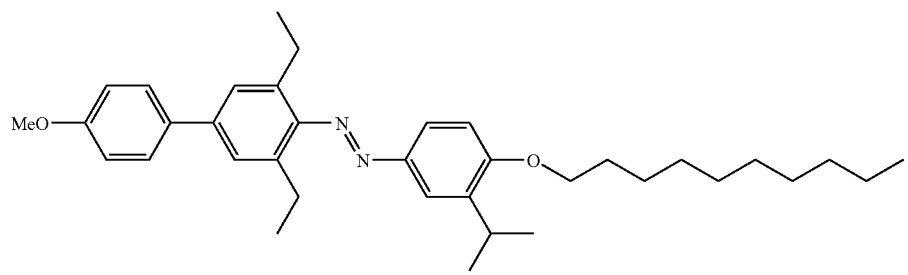

(17)

Identification results of azobenzene derivative 17 are shown below.

Azobenzene derivative 17: $^1$H NMR (270 MHz, CDCl$_3$) δ 0.86 (t, 3H, C$\underline{H}_3$), 1.04-1.54 (m, 26H, C$\underline{H}_2$ and C$\underline{H}_3$), 1.81 (m, 2H, CH$_2$), 2.70 (q, 4H, ArC$\underline{H}_2$CH$_3$), 3.33 (m, 1H, ArOC$\underline{H}$(CH$_3$)$_2$), 3.85 (s, 3H, C$\underline{H}_3$O—), 4.04 (t, 2H, ArOC$\underline{H}_2$), 6.92-7.82 (m, 9H, Ar—$\underline{H}$).

(2) Observation of Fluorescence Emission Spectra

Azobenzene derivatives 10, 11, 12, 13, 14, 15, and 17 had the same structure, with the exception of different terminal substituents. FIG. 16 shows the relation between the Hammett constant of the terminal substituent and the $\lambda_{max}$ of the fluorescence obtained by irradiation with excitation light (wavelength 365 nm).

2H, C$\underline{H}_2$), 2.66 (q, 4H, ArC$\underline{H}_2$CH$_3$), 3.33 (m, 1H, ArOC$\underline{H}$(CH$_3$)$_2$), 3.94 (s, 3H, C$\underline{H}_3$O—), 4.02 (t, 2H, ArOC$\underline{H}_2$), 6.7-8.3 (m, 8H, Ar—$\underline{H}$).

Azobenzene Derivative 20: 1H NMR (270 MHz, CDCl$_3$) δ 0.85 (t, 3H, C$\underline{H}_3$), 1.05-1.54 (m, 26H, C$\underline{H}_2$ and C$\underline{H}_3$), 1.81 (m, 2H, C$\underline{H}_2$), 2.66 (q, 4H, ArC$\underline{H}_2$CH$_3$), 3.34 (m, 1H, ArOC$\underline{H}$(CH$_3$)$_2$), 3.89 (s, 3H, C$\underline{H}_3$O—), 4.05 (t, 2H, ArOC$\underline{H}_2$), 6.93 (d, 1H, Ar—H), 7.04-7.84 (m, 7H, Ar—$\underline{H}$).

Azobenzene derivative 21: 1H NMR (270 MHz, CDCl$_3$) δ 0.84 (t, 3H, C$\underline{H}_3$), 1.02-1.52 (m, 26H, C$\underline{H}_2$ and C$\underline{H}_3$), 1.81 (m, 2H, C$\underline{H}_2$), 2.69 (q, 4H, ArC$\underline{H}_2$CH$_3$), 3.35 (m, 1H, ArOC$\underline{H}$(CH$_3$)$_2$), 3.78 (s, 3H, C$\underline{H}_3$O—), 3.82 (s, 3H, C$\underline{H}_3$O—), 4.03 (t, 2H, ArOC$\underline{H}_2$), 6.53-7.80 (m, 8H, Ar—$\underline{H}$).

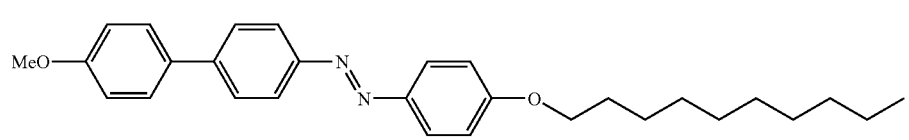

(18)

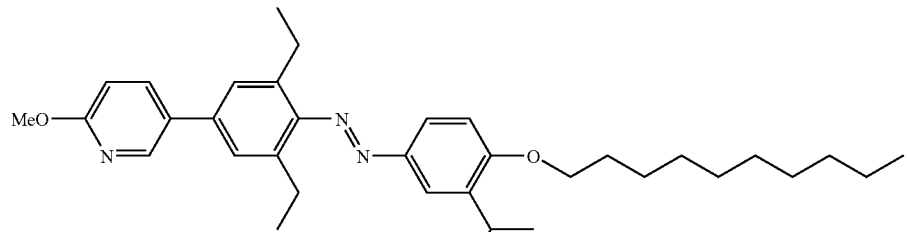

(19)

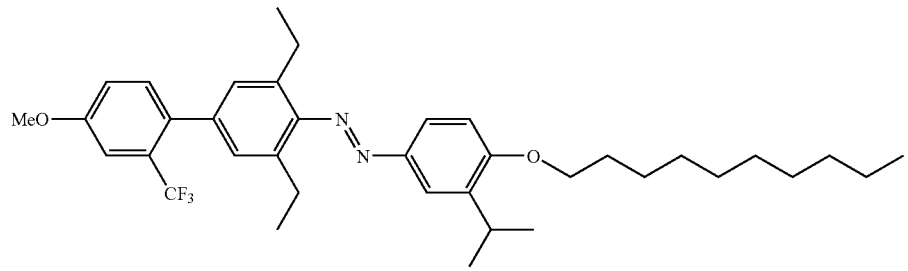

(20)

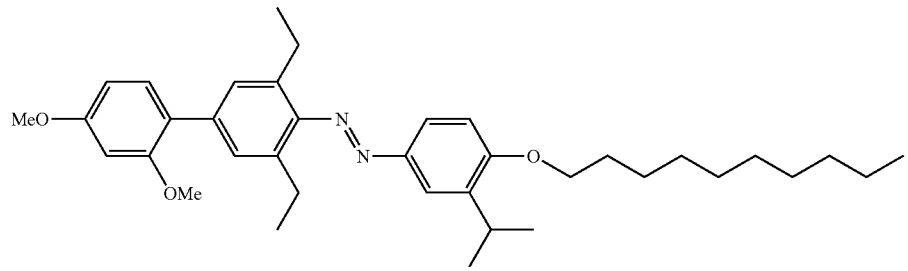

(21)

(4) Observation of Absorption and Fluorescence Emission Spectra

By the same method as in 2. above, solutions containing azobenzene derivatives 17 to 21 were irradiated with UV light (wavelength 365 nm) until the increase in fluorescence reached saturation. The solutions were then placed for 12 days in a dark location at room temperature.

Figure 17:
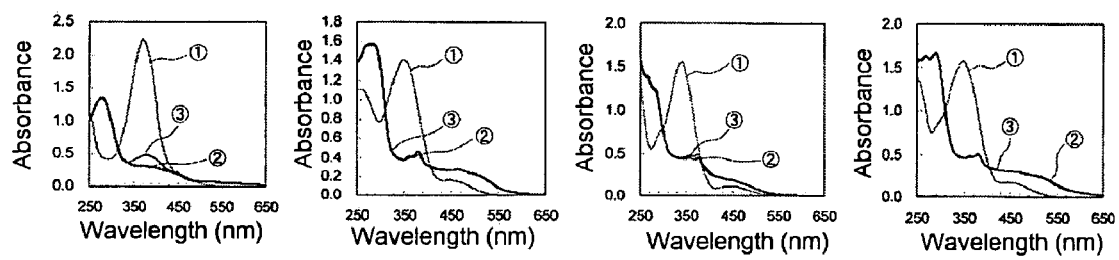
FIG. 17 shows absorption spectra and fluorescence emission spectra of fluorescent particles formed by azobenzene derivatives 17, 18, 20, and 21.
Figure 17:
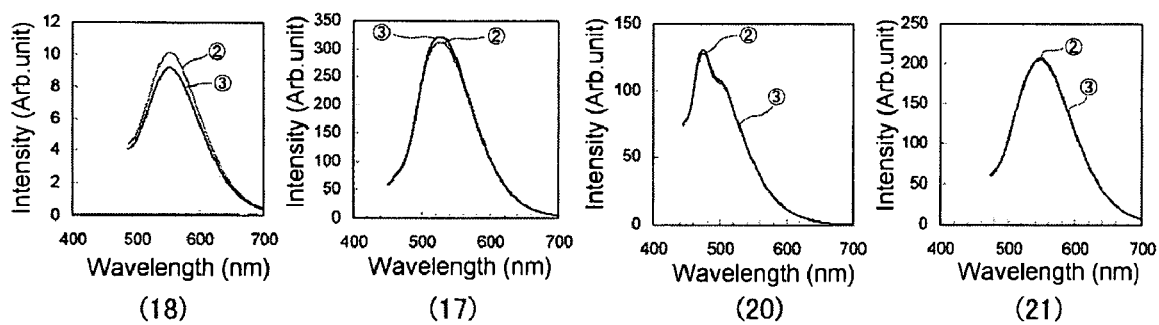

FIG. 17 shows absorption spectra and fluorescence emission spectra for the solutions of azobenzene derivatives 17, 18, 20, and 21 prior to the start of irradiation with UV light, after irradiation, and after standing at room temperature.

Table 2 shows the change in the fluorescence intensity and the $\lambda_{max}$ of the fluorescence emission spectra (i) after irradiation with UV light and (ii) after standing at room temperature following irradiation with UV light.

The above fluorescence emission spectra are the spectra of the fluorescence emitted when the UV light irradiated (wavelength 365 nm) served as the excitation light.

TABLE 2

| | $\lambda$max | | |
|---|---|---|---|
| | (i)After irradiation with UV light (Time required to saturate fluorescence increase is indicated in parentheses.) | (ii)After standing in a dark room at room temperature (Standing time is indicated in parentheses.) | Change in fluorescence intensity |
| Azobenzene derivative 17 | 526(960 min.) | 527(12 days) | 0.030 |

TABLE 2-continued

| | $\lambda$max | | |
|---|---|---|---|
| | (i)After irradiation with UV light (Time required to saturate fluorescence increase is indicated in parentheses.) | (ii)After standing in a dark room at room temperature (Standing time is indicated in parentheses.) | Change in fluorescence intensity |
| Azobenzene derivative 18 | 551(720 min.) | 553(12 days) | −0.082 |
| Azobenzene derivative 20 | 475(1140 min.) | 474(12 days) | −0.010 |
| Azobenzene derivative 21 | 548(1140 min.) | 548(12 days) | −0.017 |

Change in fluorescence intensity = {(fluorescence intensity of (ii))/(fluorescence intensity of (i))}/fluorescence intensity of (i)

As shown in FIG. 17 and Table 2, only azobenzene derivative 18 exhibited a marked change in absorption spectrum and fluorescence emission spectrum when placed in a dark room at room temperature following irradiation with UV light. This was attributed to the progression of cis to trans isomerization when placed in a dark room at room temperature following irradiation with UV light. By contrast, azobenzene derivatives 17, 20, and 21 had high cis stability derived from their molecular structures due to the presence of substituents at prescribed positions, thereby permitting the maintenance of stable absorption spectra and stable fluorescence intensity. Azobenzene derivative 19 similarly maintained a stable absorption spectrum and stable fluorescence intensity.

Figure 18:
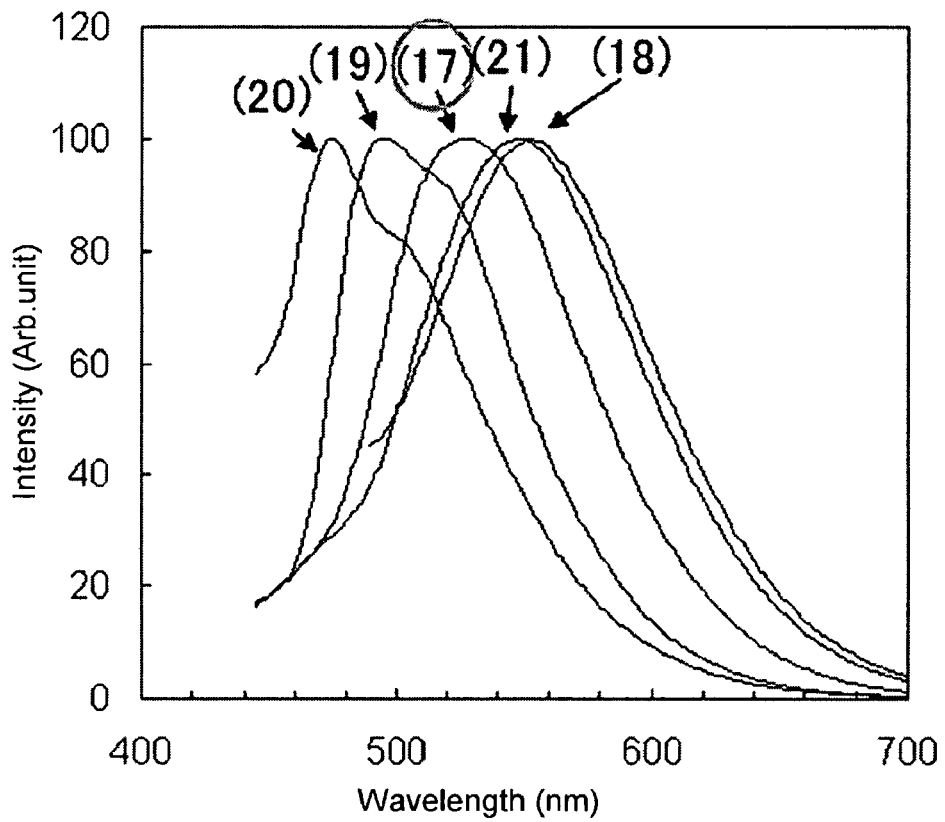
FIG. 18 shows a figure showing the superimposed fluorescence emission spectra of azobenzene derivatives 17 to 21.

FIG. 18 shows the superimposed fluorescence emission spectra of azobenzene derivatives 17 to 21. Adopting azobenzene derivative 17 as a reference, azobenzene derivative 19, which had a structure in which the phenyl group of azobenzene derivative 17 had been replaced with a pyridinyl group, exhibited a fluorescence wavelength shifted to the short wavelength side. This was attributed to the pyridinyl group, which had a higher electron-withdrawing ability than the phenyl group. Further, azobenzene derivative 20, which had the structure of azobenzene derivative 17 into which an electron-withdrawing group in the form of $CF_3$ had been introduced, also exhibited a shift to a shorter fluorescence wavelength than azobenzene derivative 17.

Conversely, azobenzene derivative 21, which had the structure of azobenzene derivative 17 into which an electron-donating group in the form of —OMe had been introduced, exhibited a shift to a longer fluorescence wavelength than azobenzene derivative 17.

(2) Observation of Fluorescence Emission Spectra of Azobenzene Derivatives 15 and 16

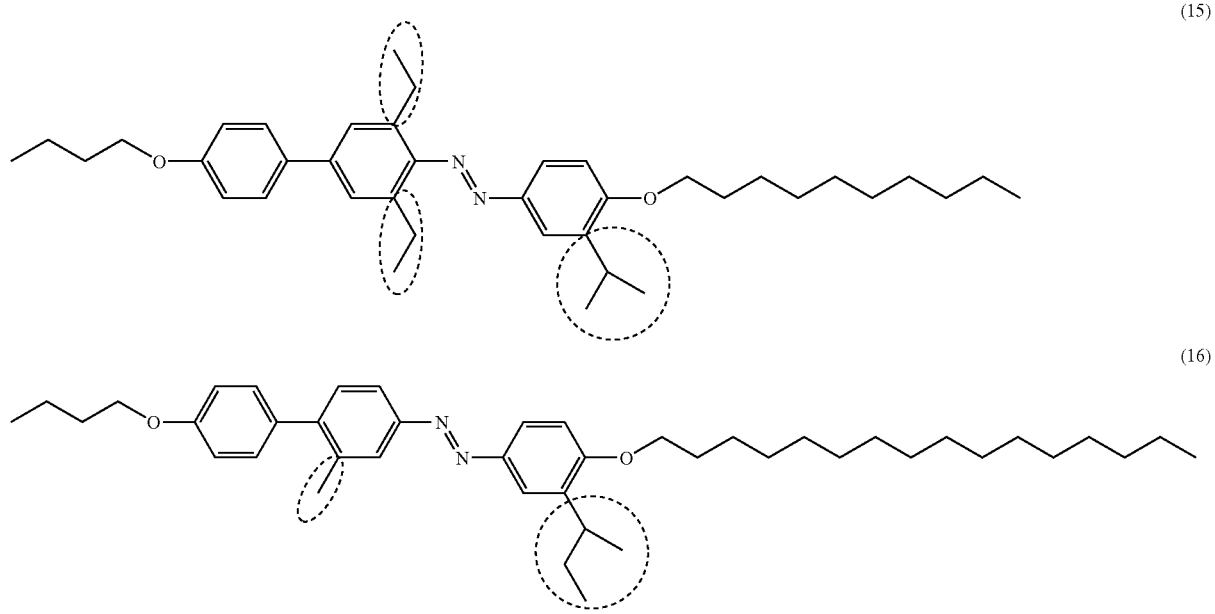

(15)

(16)

Figure 19:
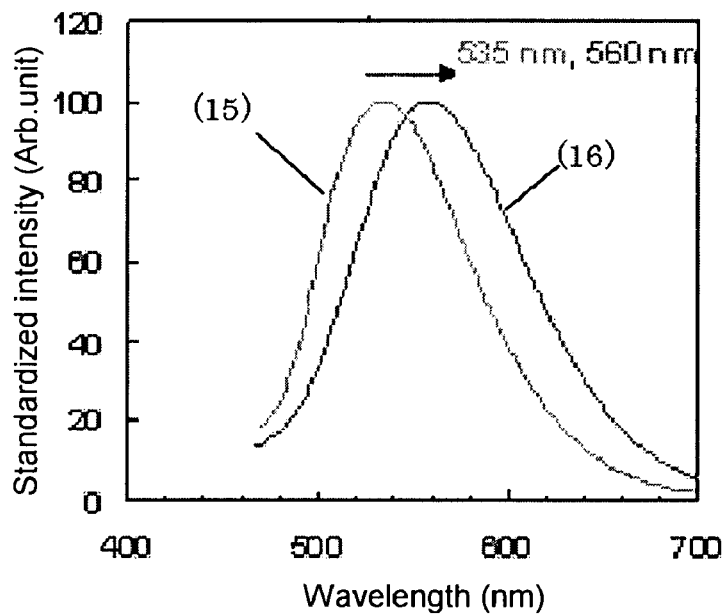
FIG. 19 shows fluorescence emission spectra of fluorescent particles formed by azobenzene derivatives 15 and 16.

Using the same method as in 2. above, solutions containing azobenzene derivatives 15 and 16 were irradiated with Lw light (wavelength 365 nm) until the increase in fluorescence reached saturation. The fluorescence emission spectra obtained are shown in FIG. 19. These fluorescence emission spectra are the spectra of fluorescence emitted when the UV light irradiated (365 nm) served as excitation light.

As shown in FIG. 19, the fluorescence emission spectrum of the fluorescent particles obtained from azobenzene derivative 16 were shifted farther to the long wavelength side than the fluorescence emission spectrum of the fluorescent particles obtained from azobenzene derivative 15.

The above results showed that changing the electric properties (electron-withdrawing ability and electron-donating ability) of the substituents and atoms constituting the ring structure contained in the azobenzene derivative could be used to shift the wavelength of fluorescence to the short or long wavelength side. This property can be exploited to readily design fluorescent particles emitting desired fluorescence that was purple, blue, green, yellow, orange, or red, for example. It was also possible to anticipate the color of the fluorescence based on the molecular structure and functional groups.

The azobenzene derivative of the present invention can form aggregates to emit high-intensity fluorescence that is stable over extended periods. The stable emission of high-intensity fluorescence in aggregates is desirable in solid-state fluorescent materials, such as thin films, and application to a variety of devices can be anticipated.

The present invention also permits the ready designing of fluorescent materials emitting a desired fluorescence based on molecular structure and functional groups. Further, the wavelength of the excitation light can be changed to obtain fluorescence of different colors from a single type of fluorescent particle.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A fluorescent particle formed by aggregates of the azobenzene derivative denoted by general formula (II):

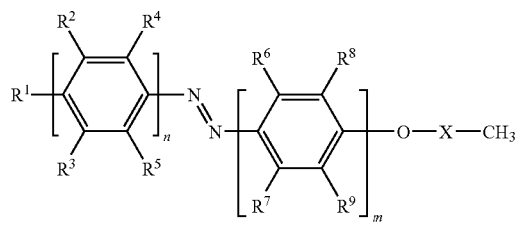

(II)

wherein, in general formula (II),

R$^1$ denotes a hydrogen atom, halogen atom, alkoxy group, alkyl group, cycloalkyl group, aryl group, heterocyclic group, cyano group, ester group, ketone group, -CA$_3$, —(C=O)A, —(C=O)NA$_2$, -BA, -OA, -SA, -NA$_2$, —(P=O)A$_2$ or an organic fluorescent group, where A denotes a hydrogen atom, halogen atom, alkoxy group or alkyl group, as well as when multiple atoms and/or groups denoted by A are present in a single group, they are identical to or different from each other, R$^2$ to R$^9$ each independently denotes a hydrogen atom, halogen atom, alkoxy group, alkyl group, cycloalkyl group, aryl group, heterocyclic group, cyano group, ester group, ketone group, -CA"$_3$, —(C=O)A", —(C=O)NA"$_2$, -BA", -OA", -SA", -NA"$_2$, —(P=O)A"$_2$, or an organic fluorescent group, where A" denotes a hydrogen atom, halogen atom, alkoxy group or alkyl group, as well as when multiple atoms and/or groups denoted by A" are present in a single group, they are identical to or different from each other, wherein at least R$^4$ and R$^5$ in two phenylene rings bonded through an azo group are substituents other than hydrogen atoms, and when multiple atoms and/or groups denoted by any of R$^2$ to R$^9$ are present with n and/or m being an integer equal to or greater than 2, they are identical to or different from each other, X denotes an alkylene group optionally comprising a hetero atom, and m and n each independently denotes an integer ranging from 1 to 8, where, when multiple phenylene groups are present with n being an integer equal to or greater than 2, they are identical to or different from each other, as well as when multiple phenylene groups are present with m being an integer equal to or greater than 2, they are identical to or different from each other.

2. The fluorescent particle formed by aggregates of claim 1, wherein R$^4$ and R$^5$ in two phenylene rings bonded through an azo group each independently denotes an alkyl group having 1 to 28 carbon atoms or an alkoxy group having 1 to 28 carbon atoms.

3. A method of fabricating the fluorescent particle of claim 1, wherein UV light is irradiated to a solution comprising an organic solvent and the azobenzene derivative to form aggregates of the azobenzene derivative.

4. A method of fabricating a fluorescent particle emitting desired fluorescence when excited by irradiation with light of a predetermined wavelength, comprising:

determining a candidate derivative that is the azobenzene derivative denoted by general formula (II):

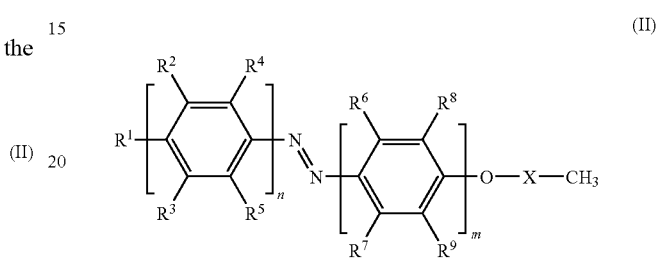

(II)

wherein, in general formula (II), R$^1$ denotes a hydrogen atom, halogen atom, alkoxy group, alkyl group, cycloalkyl group, aryl group, heterocyclic group, cyano group, ester group, ketone group, -CA$_3$, —(C=O)A, —(C=O)NA$_2$, -BA, -OA, -SA, -NA$_2$, —(P=O)A$_2$ or an organic fluorescent group, where A denotes a hydrogen atom, halogen atom, alkoxy group or alkyl group, as well as when multiple atoms and/or groups denoted by A are present in a single group, they are identical to or different from each other, R$^2$ to R$^9$ each independently denotes a hydrogen atom, halogen atom, alkoxy group, alkyl group, cycloalkyl group, aryl group, heterocyclic group, cyano group, ester group, ketone group, -CA"$_3$, —(C=O)A", —(C=O)NA"$_2$, -BA", -OA", -SA", -NA"$_2$, —(P=O)A"$_2$ or an organic fluorescent group, where A" denotes a hydrogen atom, halogen atom, alkoxy group or alkyl group, as well as when multiple atoms and/or groups denoted by A" are present in a single group, they are identical to or different from each other, wherein at least R$^4$ and R$^5$ in two phenylene rings bonded through an azo group are substituents other than hydrogen atoms, and when multiple atoms and/or groups denoted by any of R$^2$ to R$^9$ are present with n and/or m being an integer equal to or greater than 2, they are identical to or different from each other, X denotes an alkylene group optionally comprising a hetero atom, and m and n each independently denotes an integer ranging from 1 to 8, where, when multiple phenylene groups are present with n being an integer equal to or greater than 2, they are identical to or different from each other, as well as when multiple phenylene groups are present with m being an integer equal to or greater than 2, they are identical to or different from each other, which is a candidate for an azobenzene derivative used to obtain the fluorescent particle;

forming aggregates of the candidate derivative by irradiating with UV light a solution comprising the candidate derivative and an organic solvent;

irradiating the aggregates formed with excitation light of the desired wavelength;

when the fluorescence emitted by irradiation with the excitation light is:

(1) the desired fluorescence, determining the candidate derivative as the azobenzene derivative for use in fabricating the fluorescent particle;

(2) light of shorter wavelength than the desired fluorescence, determining, as the azobenzene derivative for use in fabricating the fluorescent particle, the azobenzene derivative of formula (II), which has a structure in which one or more substituents comprised in the candidate derivative has been replaced with one or more substituents of higher electron-donating ability, which has a structure in which one or more electron-donating groups have been incorporated into the candidate derivative, and/or which has a structure in which one or more atoms comprised in the ring structure of the candidate derivative has been replaced with one or more atoms of higher electron-donating ability; or (3) light of longer wavelength than the desired fluorescence, determining, as the azobenzene derivative for use in fabricating the fluorescent particle, the azobenzene derivative of formula an (II), which has a structure in which one or more substituents comprised in the candidate derivative has been replaced with one or more substituents of higher electron-withdrawing ability, which has a structure in which one or more electron-withdrawing groups have been incorporated into the candidate derivative, and/or which has a structure in which one or more atoms comprised in the ring structure of the candidate derivative has been replaced with one or more atoms of higher electron-withdrawing ability; and irradiating with UV light a solution comprising the azobenzene derivative that has been determined and an organic solvent to form aggregates of the determined azobenzene derivative.

* * * * *